US012531048B1

(12) United States Patent
Pulugurtha et al.

(10) Patent No.: US 12,531,048 B1
(45) Date of Patent: Jan. 20, 2026

(54) STEP-SIZE CONTROL FOR MULTI-CHANNEL ACOUSTIC ECHO CANCELLER

(71) Applicant: Amazon Technologies, Inc., Seattle, WA (US)

(72) Inventors: Sai Ravi Teja Pulugurtha, Milpitas, CA (US); Robert Ayrapetian, Morgan Hill, CA (US); Pradeep Kumar Govindaraju, San Jose, CA (US); Madhuri Saraf, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 18/460,955

(22) Filed: Sep. 5, 2023

(51) Int. Cl.
*G10K 11/178* (2006.01)
*H04M 9/08* (2006.01)

(52) U.S. Cl.
CPC .. *G10K 11/17881* (2018.01); *G10K 11/17854* (2018.01); *H04M 9/082* (2013.01)

(58) Field of Classification Search
CPC ....... G10K 11/17881; G10K 11/17854; H04M 9/08
See application file for complete search history.

(56) References Cited

U.S. PATENT DOCUMENTS

| | | | |
|---|---|---|---|
| 5,808,967 A | 9/1998 | Yu et al. | |
| 6,049,607 A | 4/2000 | Marash et al. | |
| 6,836,243 B2 | 12/2004 | Kajala et al. | |
| 7,068,711 B2* | 6/2006 | Huang | H04L 25/03038 |
| | | | 379/406.01 |
| 7,117,145 B1* | 10/2006 | Venkatesh | G10L 21/0208 |
| | | | 704/200 |
| 7,174,022 B1 | 2/2007 | Zhang et al. | |
| 7,190,775 B2 | 3/2007 | Rambo | |
| 7,359,520 B2 | 4/2008 | Brennan et al. | |
| 8,139,787 B2 | 3/2012 | Haykin et al. | |
| 8,160,273 B2 | 4/2012 | Visser et al. | |
| 8,175,291 B2 | 5/2012 | Chan et al. | |
| 8,296,143 B2 | 10/2012 | Kudoh | |
| 8,321,214 B2 | 11/2012 | Chan et al. | |

(Continued)

OTHER PUBLICATIONS

U.S. Appl. No. 17/488,471, filed Sep. 29, 2021.

(Continued)

*Primary Examiner* — Akelaw Teshale
(74) *Attorney, Agent, or Firm* — Pierce Atwood LLP

(57) ABSTRACT

An acoustic echo cancellation (AEC) system that dynamically controls an adaptation speed of an adaptive filter, enabling the adaptive filter to converge quickly while protecting near-end speech. For example, a device may control the adaptation speed of the adaptive filter to adapt quickly when near-end speech is not present and adapt slowly when near-end speech is present. The device controls the adaptation speed by dynamically determining step-size values and/or performing error normalization to limit the rate of adaptation. In some examples, the device determines the variable step-size parameter based on a relative strength of a microphone signal and a reference signal over time. For example, the device can compare current energy levels of the microphone signal and the reference signal to a range of energy levels to determine a microphone step-size value, a reference step-size value, and an AEC step-size value.

20 Claims, 12 Drawing Sheets

(56) References Cited

U.S. PATENT DOCUMENTS

| | | |
|---|---|---|
| 8,538,749 B2 | 9/2013 | Visser et al. |
| 8,620,672 B2 | 12/2013 | Visser et al. |
| 8,744,849 B2 | 6/2014 | Liao |
| 8,831,936 B2 | 9/2014 | Toman et al. |
| 8,849,657 B2 | 9/2014 | Shin |
| 8,861,756 B2 | 10/2014 | Zhu et al. |
| 8,929,564 B2 | 1/2015 | Kikkeri |
| 8,954,324 B2 | 2/2015 | Wang et al. |
| 9,036,815 B2 * | 5/2015 | Lee ............... H04B 3/235 379/406.08 |
| 9,048,942 B2 | 6/2015 | Hershey et al. |
| 9,173,025 B2 | 10/2015 | Dickins et al. |
| 9,224,393 B2 | 12/2015 | Kjems et al. |
| 9,275,642 B2 | 3/2016 | Abdossalami et al. |
| 9,338,551 B2 | 5/2016 | Thyssen et al. |
| 9,432,769 B1 | 8/2016 | Sundaram et al. |
| 9,456,276 B1 | 9/2016 | Chhetri |
| 9,530,406 B2 | 12/2016 | Oh |
| 9,653,060 B1 | 5/2017 | Hilmes et al. |
| 9,659,555 B1 | 5/2017 | Hilmes et al. |
| 9,689,960 B1 | 6/2017 | Barton et al. |
| 9,711,131 B2 * | 7/2017 | Christoph ............... H04K 3/825 |
| 9,747,920 B2 | 8/2017 | Ayrapetian et al. |
| 9,754,605 B1 * | 9/2017 | Chhetri ............... H04R 3/02 |
| 9,818,425 B1 | 11/2017 | Ayrapetian et al. |
| 9,966,059 B1 * | 5/2018 | Ayrapetian ............... H04R 1/08 |
| 9,966,086 B1 | 5/2018 | Piersol et al. |
| 9,967,661 B1 | 5/2018 | Hilmes et al. |
| 9,973,849 B1 | 5/2018 | Zhang et al. |
| 10,187,721 B1 | 1/2019 | Mansour |
| 10,306,361 B2 | 5/2019 | Morton et al. |
| 10,339,954 B2 | 7/2019 | Kamdar et al. |
| 10,366,702 B2 | 7/2019 | Morton et al. |
| 10,403,299 B2 | 9/2019 | Wung et al. |
| 10,475,471 B2 | 11/2019 | Ebenezer |
| 10,499,139 B2 | 12/2019 | Ganeshkumar |
| 10,522,167 B1 | 12/2019 | Ayrapetian et al. |
| 10,598,543 B1 | 3/2020 | Mansour et al. |
| 10,650,840 B1 * | 5/2020 | Solbach ............... G10L 21/0224 |
| 10,657,981 B1 | 5/2020 | Mansour et al. |
| 10,771,894 B2 | 9/2020 | Janse et al. |
| 10,790,874 B2 * | 9/2020 | Christoph ............... H04B 3/237 |
| 10,887,709 B1 | 1/2021 | Mansour et al. |
| 11,094,334 B2 | 8/2021 | Wang et al. |
| 11,189,297 B1 * | 11/2021 | Nakagawa ............... H04R 3/02 |
| 11,200,908 B2 | 12/2021 | Liu et al. |
| 11,205,438 B1 * | 12/2021 | Chhetri ............... H04R 3/02 |
| 11,539,833 B1 * | 12/2022 | Nakagawa ............... H04R 3/02 |
| 11,657,829 B2 | 5/2023 | Popovic et al. |
| 2004/0062403 A1 * | 4/2004 | Gay ............... H04M 9/082 381/71.11 |
| 2004/0175006 A1 | 9/2004 | Kim et al. |
| 2008/0175375 A1 * | 7/2008 | Ishiguro ............... H04B 3/234 379/406.08 |
| 2008/0208538 A1 | 8/2008 | Visser et al. |
| 2008/0312918 A1 | 12/2008 | Kim |
| 2009/0034752 A1 | 2/2009 | Zhang et al. |
| 2013/0304476 A1 | 11/2013 | Kim et al. |
| 2014/0025374 A1 | 1/2014 | Lou |
| 2015/0371658 A1 * | 12/2015 | Gao ............... H04M 9/082 381/66 |
| 2016/0006880 A1 * | 1/2016 | Lu ............... H04M 9/082 379/406.08 |
| 2016/0205263 A1 | 7/2016 | Liu et al. |
| 2017/0142532 A1 * | 5/2017 | Pan ............... H04M 9/082 |
| 2021/0312936 A1 | 10/2021 | Hu |
| 2022/0406286 A1 | 12/2022 | Yamanashi et al. |
| 2023/0055257 A1 | 2/2023 | Li |

OTHER PUBLICATIONS

U.S. Appl. No. 17/470,035, filed Sep. 9, 2021.
U.S. Appl. No. 18/323,697, filed May 25, 2023.
U.S. Appl. No. 18/466,272, filed Sep. 13, 2023.

\* cited by examiner

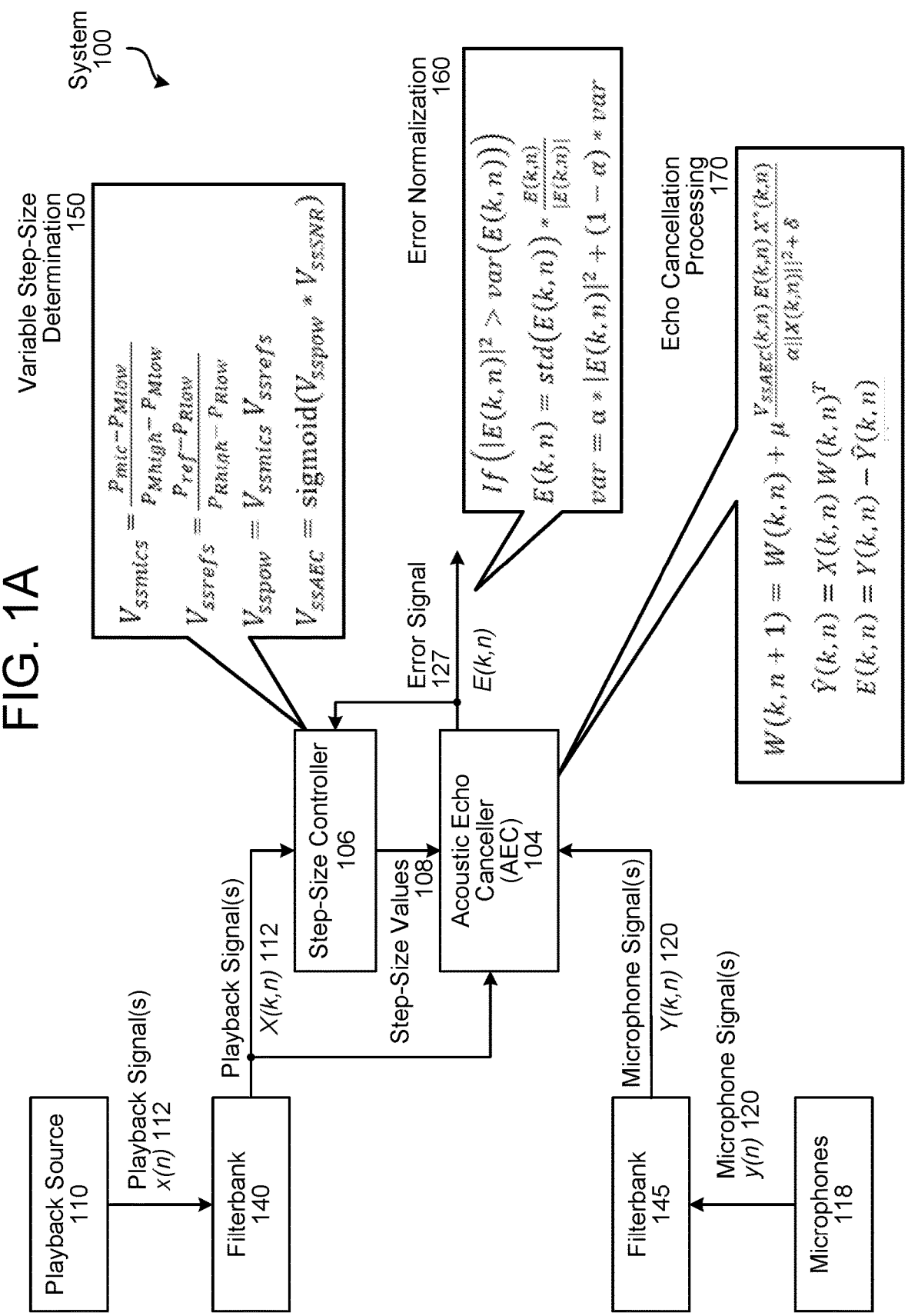

FIG. 4
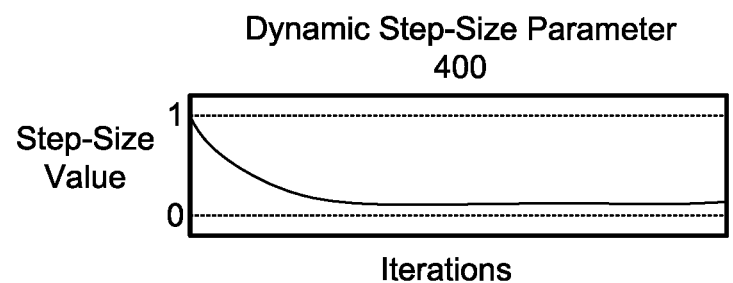
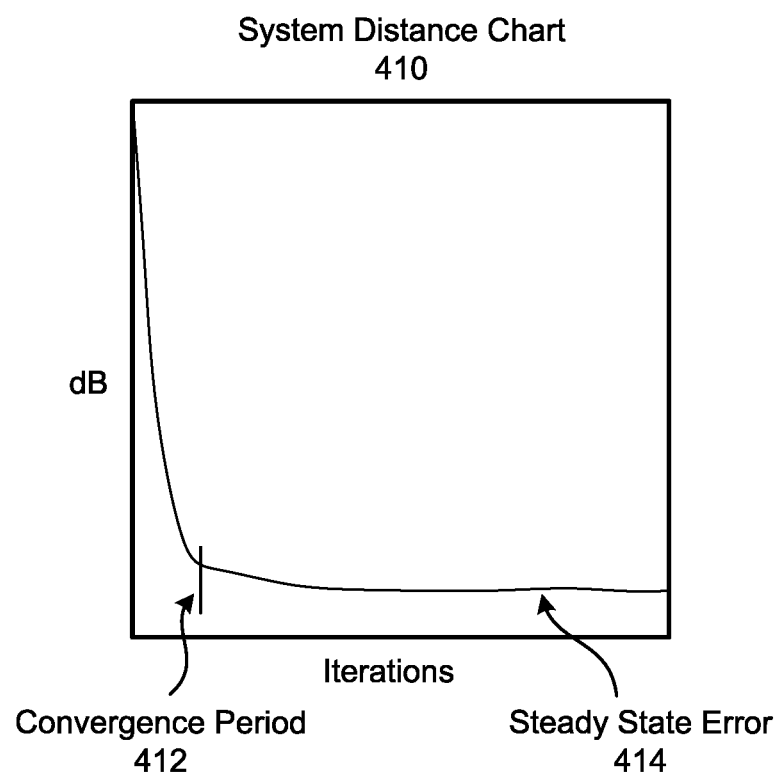

FIG. 8

Microphone Variable Step-Size 810 →
$$V_{ssmics} = \frac{P_{mic} - P_{Mlow}}{P_{Mhigh} - P_{Mlow}}$$

$0 \leq V_{ssmics} \leq 1$
$V_{ssmics} = 0$ if $P_{mic} \leq P_{Mlow}$
$V_{ssmics} = 1$ if $P_{mic} \geq P_{Mhigh}$ Reference Variable Step-Size 820 →
$$V_{ssrefs} = \frac{P_{ref} - P_{Rlow}}{P_{Rhigh} - P_{Rlow}}$$

$0 \leq V_{ssrefs} \leq 1$
$V_{ssrefs} = 0$ if $P_{ref} \leq P_{Rlow}$
$V_{ssrefs} = 1$ if $P_{ref} \geq P_{Rhigh}$ SNR Variable Step-Size 830 →
$$V_{ssSNR} = \frac{A}{1 + B * SNR}$$

$V_{ssSNR} = \min(1, V_{ssSNR})$

AEC Variable Step-Size 840 →
$$V_{ssAEC} = \text{sigmoid}(V_{ssmics} * V_{ssrefs} * V_{ssSNR})$$

Coefficient Update 850 →
$$W(k, n+1) = W(k, n) + \mu \frac{V_{ssAEC}(k,n) E(k,n) X^*(k,n)}{\alpha \|X(k,n)\|^2 + \delta}$$

FIG. 9
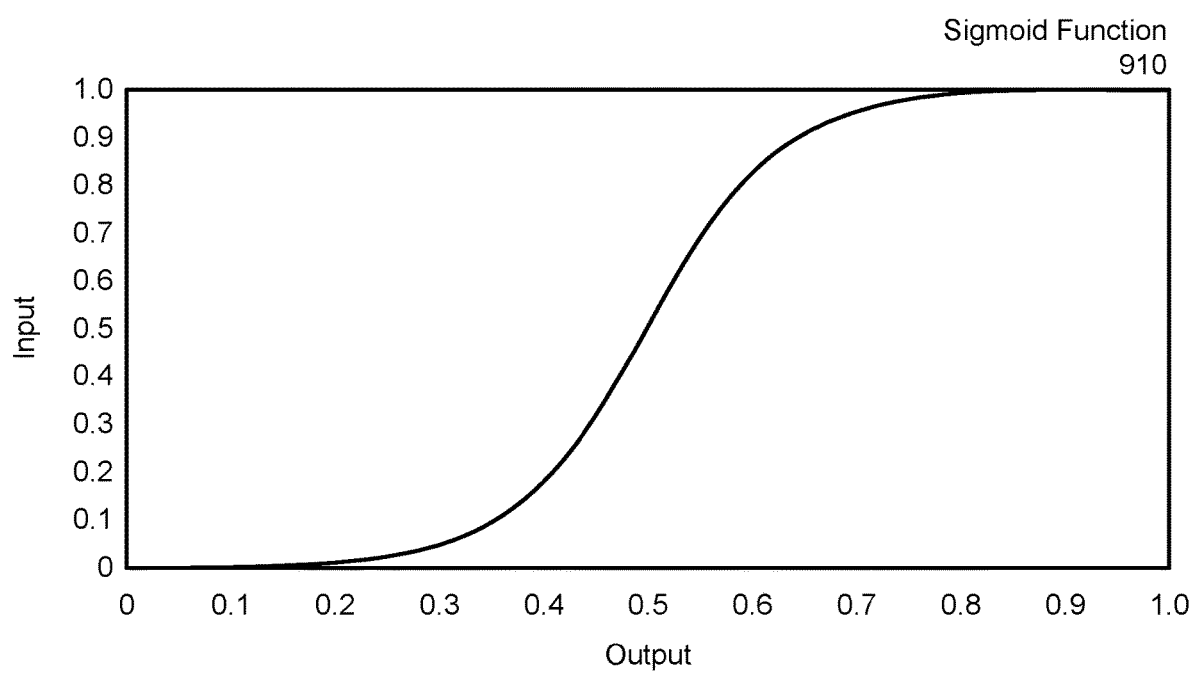
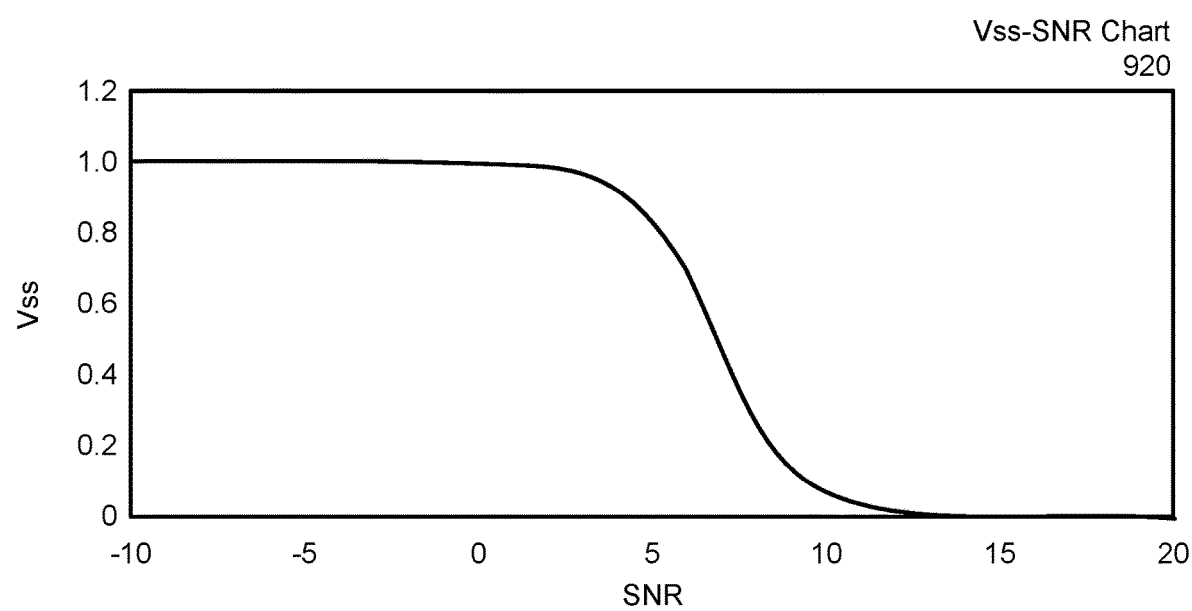

STEP-SIZE CONTROL FOR MULTI-CHANNEL ACOUSTIC ECHO CANCELLER

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIG. 1A illustrates an echo cancellation system that dynamically controls a step-size parameter according to embodiments of the present disclosure.

FIG. 4 illustrates an example of a convergence period and steady state error when a step-size parameter is controlled dynamically according to embodiments of the present disclosure.

FIG. 8 illustrates examples of determining step-size parameters according to embodiments of the present disclosure.

FIG. 9 illustrates examples of a sigmoid function and a variable step-size controlled based on a signal quality metric according to embodiments of the present disclosure.

DETAILED DESCRIPTION

Figure 1B:
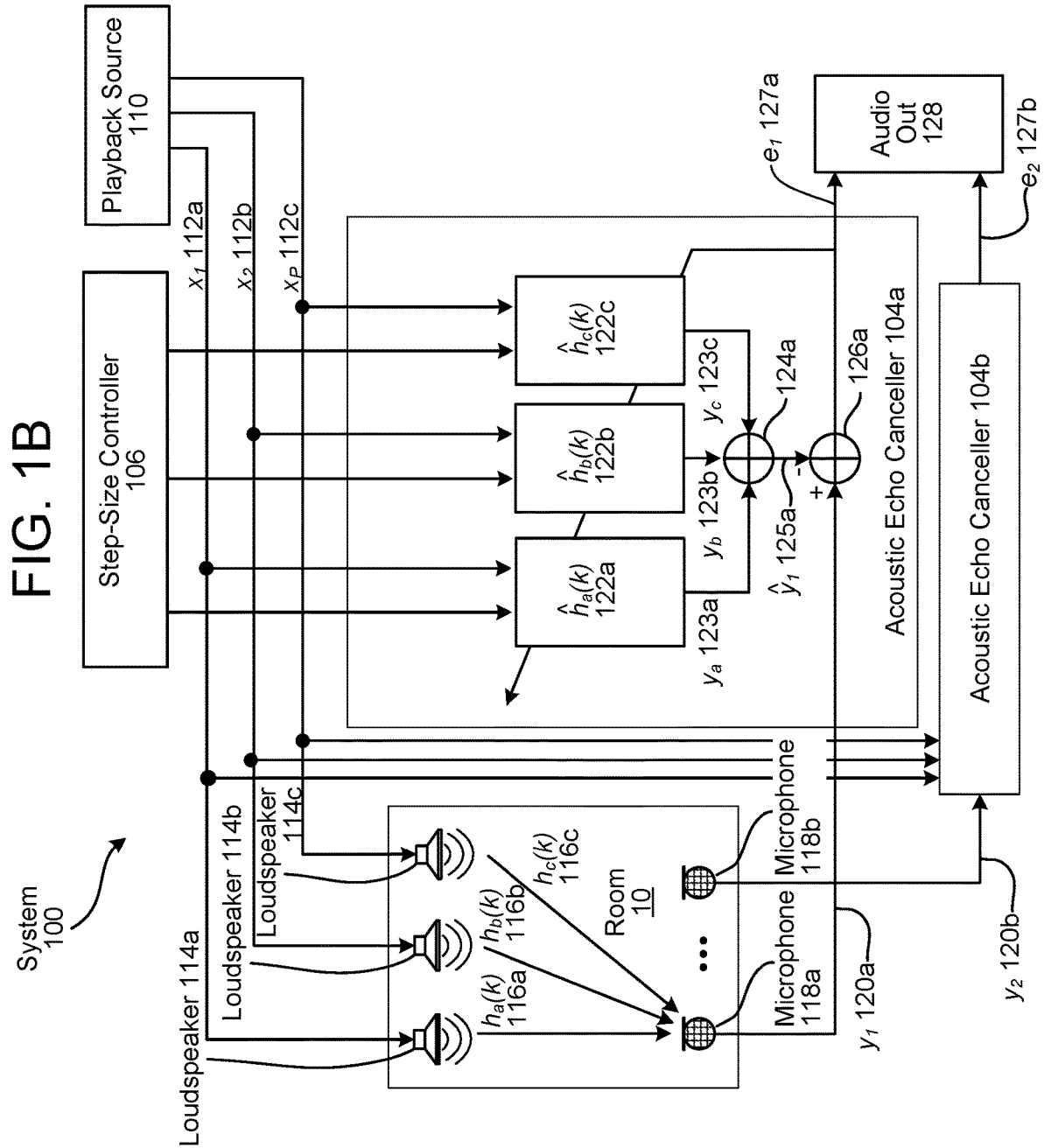
FIG. 1B illustrates an echo cancellation system that dynamically controls a step-size parameter according to embodiments of the present disclosure.

Electronic devices may be used to capture and process audio data. The audio data may be used for voice commands and/or may be output by loudspeakers as part of a communication session. In some examples, loudspeakers may generate audio using playback audio data while a microphone generates local audio data. An electronic device may perform audio processing, such as acoustic echo cancellation (AEC), residual echo suppression (RES), and/or the like, to remove an "echo" signal corresponding to the playback audio data from the local audio data, isolating local speech to be used for voice commands and/or the communication session.

AEC systems eliminate undesired echo due to coupling between a loudspeaker and a microphone. The main objective of AEC is to identify an acoustic impulse response in order to produce an estimate of the echo (e.g., estimated echo signal) and then subtract the estimated echo signal from the microphone signal. Due to internal coupling and nonlinearity in the acoustic path from the loudspeakers to the microphone, performing AEC processing may result in distortion and other signal degradation such that the output of the AEC includes a residual echo signal. In some examples, this distortion may be caused by imprecise time alignment between the playback audio data and the local audio data, which may be caused by variable delays, dropped packets, clock jitter, clock skew, and/or the like.

To improve echo cancellation, devices, systems and methods are disclosed for dynamically controlling an adaptation speed of an adaptive filter, enabling the adaptive filter to converge quickly while protecting near-end speech. For example, a device may control the adaptation speed of the adaptive filter to adapt quickly when near-end speech is not present and adapt slowly when near-end speech is present. This enables the adaptive filter to accurately model an estimated echo signal without adapting to the near-end speech. The device controls the adaptation speed by dynamically determining step-size values and/or performing error normalization to limit the rate of adaptation. In some examples, the device determines the variable step-size parameter based on a relative strength of a microphone signal and a reference signal over time. For example, the device can compare current energy levels of the microphone signal and the reference signal to a range of energy levels to determine a microphone step-size value, a reference step-size value, and an AEC step-size value. In this example, the AEC step-size value is high (e.g., enabling faster convergence) only when the microphone signal and the reference signal are relatively strong, which indicates that most of the microphone signal corresponds to the echo signal and that near-end speech is not present.

FIG. 1A illustrates a high-level conceptual block diagram of an echo cancellation system that dynamically controls a step-size parameter according to embodiments of the present disclosure. In some examples, the system 100 may comprise a device 102 that may include a playback source 110, microphones 118, an acoustic echo canceller (AEC) component 104, a step-size controller 106, a first filterbank 140, and a second filterbank 145, although the disclosure is not limited thereto and the device 102 may include additional components not illustrated in FIG. 1A.

As illustrated in FIG. 1A, the playback source 110 may provide playback signal(s) x(n) 112, which corresponds to playback audio data sent to loudspeakers 114 of the device 102 to generate output audio. The number of playback signal(s) x(n) 112 may correspond to a number of loudspeakers 114 associated with the system 100 and may vary without departing from the disclosure. As shown in FIG. 1A, the first filterbank 140 may receive the playback signal(s) x(n) 112 in a time domain and may generate playback signal(s) X(k,n) 112 in a frequency domain or subband domain, as described in greater detail below with regard to FIGS. 2A-2C.

The microphones 118 may capture input audio and generate microphone signal(s) y(n) 120. The number of microphone signal(s) y(n) 120 may correspond to a number of microphones 118 associated with the system 100 and may vary without departing from the disclosure. As described in greater detail below with regard to FIG. 1B, the microphone signal(s) y(n) 120 may include a representation of local speech, a portion of the output audio generated by the loudspeakers 114 (e.g., an echo signal), and/or noise or other audible sounds. The second filterbank 145 may receive the microphone signal(s) y(n) 120 in the time domain and may generate microphone signal(s) Y(k,n) 120 in the frequency domain or subband domain.

The AEC component 104 may receive the playback signal(s) X(k,n) 112 and the microphone signal(s) Y(k,n) 120 and may perform acoustic echo cancellation to generate an echo estimate signal 125 and an error signal 127. For example, the AEC component 104 may use adaptive filters to determine an estimate of the echo signal recaptured by the microphones 118 and generate the echo estimate signal 125, which will be described in greater detail below with regard to FIG. 1B. The AEC component 104 may then subtract the echo estimate signal 125 from the microphone signal(s) Y(k,n) 120 to generate the error signal 127. Thus, the AEC component 104 performs echo cancellation to remove the echo estimate signal 125 from the microphone signal(s) Y(k,n) 120, such that the error signal 127 corresponds to the local speech.

The step-size controller 106 may receive the playback signal(s) X(k,n) 112 and the error signal 127 and may determine step-size values 108. In some examples, the step-size values 108 may be determined for individual playback channels (e.g., playback signals 112), microphone channels (e.g., microphone signals 120), and/or tone indexes on a frame-by-frame basis, although the disclosure is not limited thereto. The step-size values 108 are used by the AEC component 104 to update the adaptive filters, as described in greater detail below. While not illustrated in FIG. 1A, the step-size controller 106 may receive microphone signal(s) Y(k,n) 120, the echo estimate signal 125, and/or other signals without departing from the disclosure.

While FIG. 1A illustrates a single AEC component 104, the disclosure is not limited thereto and the device 102 may include multiple AEC components 104 and/or the AEC component 104 may be a multi-channel acoustic echo canceller (MC-AEC) component without departing from the disclosure. Thus, the device 102 may use each reference signal X(k,n) 112 to perform AEC processing on each microphone signal Y(k,n) 120 generated by microphones 118 without departing from the disclosure. While the following description refers only to a single acoustic echo canceller 104, the concepts may be applied to multiple AEC components 104 without departing from the disclosure. Similarly, for ease of illustration, FIG. 1A and a corresponding description may refer to a single echo estimate signal 125 and a single error signal 127 generated by the AEC component 104. However, the disclosure is not limited thereto, and the device 102 may generate multiple echo estimate signals and/or multiple error signals without departing from the disclosure.

As illustrated in FIG. 1A, the system 100 may control an adaptation speed of the AEC component 104 by dynamically determining the step-size values $V_{ssAEC}$ (e.g., variable step-size determination 150) and/or performing error normalization 160 to limit the rate of adaptation. As will be described in greater detail below, the system 100 may determine the step-size values $V_{ssAEC}$ using a combination of a microphone step-size value $V_{ssmics}$ and a reference step-size value $V_{ssrefs}$. Thus, the step-size values $V_{ssAEC}$ only allow the first adaptive filter to adapt quickly when both the microphone step-size value $V_{ssmics}$ and the reference step-size value $V_{ssrefs}$ are relatively high values.

The system 100 may perform power measurement to determine a current microphone level associated with the microphone signal(s) 120 over time. In some examples, the system 100 may perform the power measurement on the microphone signal(s) y(n) 120 in the time domain, after performing filtering (e.g., high pass filtering) and/or the like. When the current microphone level is below a threshold value, the system 100 may bypass and/or slow adaptation of the first adaptive filter included in the AEC component 104, while continuing to perform echo cancellation using the adaptive filter coefficients to avoid discontinuity. This prevents the first adaptive filter from adapting when there is no echo signal represented in the microphone signal(s) 120.

In some examples, the system 100 may measure the current microphone level over time and determine a first range of values corresponding to the microphone levels during a fixed time window. For example, the system 100 may perform the power measurements on the microphone signal(s) y(n) 120 in the time domain and determine a first range of values corresponding to the power measurements within the fixed time window (e.g., duration of time), and the first range of values may correspond to a lower boundary and an upper boundary indicating a range associated with the microphone power measurements within the fixed time window, although the disclosure is not limited thereto.

As illustrated in FIG. 1A, the system 100 may determine the microphone step-size value $V_{ssmics}$ using a microphone lower boundary $P_{Mlow}$, a microphone upper boundary $P_{Mhigh}$, and a current microphone power $P_{mic}$, as shown below:

$$V_{ssmics} = \frac{P_{mic} - P_{Mlow}}{P_{Mhigh} - P_{Mlow}} \quad [1]$$

where $V_{ssmics}$ denotes adaptation step-size values associated with an individual microphone 118 (e.g., one or more vectors of adaptation step-size values), $P_{Mlow}$ and $P_{Mhigh}$ represent a lower boundary and an upper boundary (e.g., first range of power values) associated with a microphone signal 120 corresponding to the individual microphone 118, and $P_{mic}$ represents a current power value of the microphone signal 120 (e.g., instantaneous power). Thus, the adaptation step-size values indicate a relative strength of the microphone signal 120 at a particular moment in time relative to the first range of power values detected within a fixed time window (e.g., first duration of time).

To improve performance, in some examples the system 100 may restrict the variable microphone step-size parameter $V_{ssmics}$ within a desired range:

$$V_{ssmics} = \min(1, V_{ssmics}) \quad [2]$$

$$V_{ssmics} = \max(0, V_{ssmics})$$

Thus, the system 100 bounds the microphone step-size parameter $V_{ssmics}$ within a range between zero and one (e.g., $0 \leq V_{ssmics} \leq 1$), such that the microphone step-size parameter $V_{ssmics}$ is equal to zero (e.g., $V_{ssmics}=0$) when the current microphone power is less than or equal to the microphone lower boundary (e.g., $P_{mic} \leq P_{Mlow}$) and equal to one (e.g., $V_{ssmics}=1$) when the current microphone power is greater than or equal to the microphone upper boundary (e.g., $P_{mic} \geq P_{Mhigh}$).

For ease of illustration, FIG. 1A and Equation [1] illustrate a generalized form of the adaptation step-size values $V_{ssmics}$ associated with an individual microphone 118. For example, as the adaptation step-size value $V_{ssmics}$ is generated in the time-domain, a single step-size value may apply to every tone index in the subband domain and/or the frequency domain. However, the disclosure is not limited thereto and the system 100 may refer to individual adaptation step-size values and/or vectors of adaptation step-size values without departing from the disclosure. For example, $V_{ssmics:m}(k, n)$ denotes microphone step-size values associated with the kth tone index (e.g., frequency bin), nth frame index (e.g., group of samples), and mth channel index (e.g., individual microphone 118) included in the microphone signal(s) 120 Y(k, n). Alternatively, $V_{ssmics:m}(n)$ denotes microphone step-size values associated with the nth frame index and the mth channel index, which may be shared across all of the tone indexes without departing from the disclosure.

Similarly, the system 100 may perform power measurement to determine a current reference level (e.g., playback level) associated with the playback signal(s) 112 over time. In some examples, the system 100 may perform the power measurement on the playback signal(s) x(n) 112 in the time domain, after performing filtering (e.g., high pass filtering) and/or the like. In some examples, when the current reference level is below a threshold value, the system 100 may bypass and/or slow adaptation of the first adaptive filter included in the AEC component 104, while continuing to perform echo cancellation using the adaptive filter coefficients to avoid discontinuity. This prevents the first adaptive filter from adapting when there is no echo signal represented in the microphone signal(s) 120.

In some examples, the system 100 may measure the current reference level over time and determine a second range of values corresponding to the reference levels during the fixed time window. For example, the system 100 may perform the power measurements on the playback signal(s) x(n) 112 in the time domain and determine the second range of values corresponding to the power measurements within the fixed time window (e.g., duration of time), and the second range of values may correspond to a lower boundary and an upper boundary indicating a range associated with the reference power measurements within the fixed time window, although the disclosure is not limited thereto.

As illustrated in FIG. 1A, the system 100 may determine the reference step-size value $V_{ssrefs}$ using a reference lower boundary $P_{Rlow}$, a reference upper boundary $P_{Rhigh}$, and a current reference power $P_{ref}$, as shown below:

$$V_{ssrefs} = \frac{P_{ref} - P_{Rlow}}{P_{Rhigh} - P_{Rlow}} \quad [3]$$

where $V_{ssrefs}$ denotes adaptation step-size values associated with an individual loudspeaker 114 (e.g., one or more vectors of adaptation step-size values), $P_{Rlow}$ and $P_{Rhigh}$ represent a lower boundary and an upper boundary (e.g., second range of power values) associated with a playback signal 112 corresponding to the individual loudspeaker 114, and $P_{ref}$ represents a current power value of the playback signal 112 (e.g., instantaneous reference power). Thus, the adaptation step-size values indicate a relative strength of the playback signal 112 at a particular moment in time relative to the second range of power values detected within the fixed time window (e.g., first duration of time).

To improve performance, in some examples the system 100 may restrict the variable reference step-size parameter $V_{ssrefs}$ within a desired range:

$$V_{ssrefs} = \min(1, V_{ssrefs}) \quad [4]$$

$$V_{ssrefs} = \max(0, V_{ssrefs})$$

Thus, the system 100 may bound the reference step-size parameter $V_{ssrefs}$ within a range between zero and one (e.g., $0 \leq V_{ssrefs} \leq 1$), such that the reference step-size parameter $V_{ssrefs}$ is equal to zero (e.g., $V_{ssrefs}=0$) when the current reference power is less than or equal to the reference lower boundary (e.g., $P_{ref} \leq P_{Rlow}$) and equal to one (e.g., $V_{ssrefs}=1$) when the current reference power is greater than or equal to the reference upper boundary (e.g., $P_{ref} \geq P_{Rhigh}$).

For ease of illustration, FIG. 1A and Equation [3] illustrate a generalized form of the adaptation step-size values $V_{ssrefs}$ associated with an individual loudspeaker 114. For example, as the adaptation step-size value $V_{ssrefs}$ is generated in the time-domain, a single step-size value may apply to every tone index in the subband domain and/or the frequency domain. However, the disclosure is not limited thereto and the system 100 may refer to individual adaptation step-size values and/or vectors of adaptation step-size values without departing from the disclosure. For example, $V_{ssrefs:p}(k, n)$ denotes reference step-size values associated with the kth tone index, nth frame index, and pth channel index (e.g., individual loudspeaker 114) included in the playback signal(s) X(k, n) 112. Alternatively, $V_{ssrefs:p}(n)$ denotes reference step-size values associated with the nth frame index and the pth channel index, which may be shared across all of the tone indexes without departing from the disclosure.

As illustrated in FIG. 1A, the system 100 may determine a combined step-size parameter $V_{sspow}$ using the microphone step-size parameter $V_{ssmics}$ and the reference step-size parameter $V_{ssrefs}$, as shown below:

$$V_{sspow} = V_{ssmics} V_{ssrefs} \quad [5.1]$$

where $V_{ssmics}$ denotes first adaptation step-size values associated with the microphone(s) 118, $V_{ssrefs}$ denotes second adaptation step-size values associated with the loudspeaker(s) 114, and $V_{sspow}$ denotes third adaptation step-size values determined using a combination of the two. In some examples, Equation [5.1] can be rewritten as:

$$V_{sspow:m \cdot p}(k,n) = V_{ssmics:m}(k,n) V_{ssrefs:p}(k,n) \quad [5.2]$$

where k denotes a tone index, n denotes a frame index, $V_{ssmics:m}(k, n)$ denotes step-size values 108 associated with the mth channel index (e.g., individual microphone 118) included in the microphone signal(s) 120 Y(k, n), $V_{ssrefs:p}(k, n)$ denotes step-size values 108 associated with the pth channel index (e.g., individual loudspeaker 114) included in the playback signal(s) X(k, n) 112, and $V_{sspow:m \cdot p}(k, n)$ denotes step-size values associated with the mth channel index and the pth channel index. While Equation [5.2] specifies a portion of the third adaptation step-size values that correspond to the mth channel index and pth channel index (e.g., $V_{sspow:m·p}(k, n)$), this is intended to conceptually illustrate how these values are calculated and the disclosure is not limited thereto. Instead, the step-size values may be generally referred to as $V_{sspow}(k, n)$, without specifying a particular combination of channel indexes.

As illustrated in FIG. 1A, the system 100 may determine a final AEC step-size parameter $V_{ssAEC}$ based on the combined step-size parameter $V_{sspow}$ and an SNR step-size parameter $V_{ssSNR}$, as shown below:

$$V_{ssAEC} = \text{sigmoid}(V_{sspow} * V_{ssSNR}) \quad [6]$$

where, $V_{sspow}$ denotes the third adaptation step-size values described above (e.g., determined using a combination of the first adaptation step-size values $V_{ssmics}$ and the second adaptation step-size values $V_{ssrefs}$), $V_{ssSNR}$ denotes fourth adaptation step-size values determined based on SNR values, sigmoid( ) denotes a sigmoid function, and $V_{ssAEC}$ denotes fifth adaptation step-size values sent to the AEC component 104 (e.g., step-size values 108). The SNR step-size values $V_{ssSNR}$ will be described in greater detail below with regard to FIGS. 7-8, while the sigmoid function will be described in greater detail below with regard to FIG. 9.

As described above, the system 100 may perform variable step-size determination 150 to determine the step-size value $V_{ssAEC}$ using a combination of a microphone step-size value $V_{ssmics}$, a reference step-size value $V_{ssrefs}$, and an SNR step-size value $V_{ssSNR}$. For example, the system 100 may multiply the combined step-size value $V_{sspow}$ and the SNR step-size value $V_{ssSNR}$ to calculate a scalar value and then map the scalar value to a step-size value $V_{ssAEC}$ (e.g., using a sigmoid curve or the like) without departing from the disclosure. However, the disclosure is not limited thereto, and in other examples the system 100 may map the combined step-size value $V_{sspow}$ to a first scalar value (e.g., using a first sigmoid curve), map the SNR step-size value $V_{ssSNR}$ to a second scalar value (e.g., using a second sigmoid curve), and then calculate the step-size value $V_{ssAEC}$ using the first scalar value and the second scalar value, although the disclosure is not limited thereto.

In some examples, a step-size value $V_{ssAEC}$ may only be relatively high (e.g., $0.5 \leq V_{ssAEC} \leq 1.0$) when both the microphone step-size value $V_{ssmics}$ and the reference step-size value $V_{ssrefs}$ are relatively high values. For example, if either the microphone step-size value $V_{ssmics}$ or the reference step-size value $V_{ssrefs}$ is low, a corresponding step-size value $V_{ssAEC}$ is relatively low and the first adaptive filter adapts slowly. Thus, the first adaptive filter adapts quickly only when the reference step-size value $V_{ssrefs}$ is relatively high (e.g., indicating that the reference signal level is near an upper boundary of recent reference values) and the microphone step-size value $V_{ssmics}$ is relatively high (e.g., indicating that the microphone signal level is near an upper boundary of recent microphone values). Therefore, the power based step-size value $V_{sspow}$ prevents the first adaptive filter from diverging due to low level signals represented in either the microphone signal(s) 120 $Y(k, n)$ or the playback signal(s) $X(k, n)$ 112.

In some examples, the system 100 may also perform error normalization 160 to control an adaptation speed of the first adaptive filter. As illustrated in FIG. 1A, the system 100 may determine the error signal 127 and may determine if the error signal 127 exceeds a first threshold value, which may correspond to a standard deviation of the error signal 127. A standard deviation (e.g., std( )) is a measure of how dispersed the data is in relation to the mean. For example, a low standard deviation indicates that data is clustered around the mean, whereas a high standard deviation indicates that data is more spread out. Thus, if the error signal 127 exceeds the first threshold value, the system 100 may perform error normalization 160 and determine the normalized error signal while limiting the rate of adaptation. An example of performing error normalization 160 is shown below:

$$\text{If } (|E(k, n)|^2 > \text{var}(E(k, n))) \quad [7]$$

$$E(k, n) = \text{std}(E(k, n)) * \frac{E(k, n)}{|E(k, n)|}$$

$$\text{var} = \alpha * |E(k, n)|^2 + (1 - \alpha) * \text{var}$$

where k denotes a tone index (e.g., frequency bin), n denotes a frame index (e.g., group of samples), $E(k, n)$ denotes the error signal 127 for the kth tone index and nth frame index, $|E(k, n)|^2$ denotes a power level associated with the error signal $E(k, n)$ 127, $\text{var}(E(k, n))$ corresponds to a first threshold value and indicates a variance of the error signal $E(k, n)$ 127, $\text{std}(E(k, n))$ indicates a standard deviation of the error signal $E(k, n)$ 127 (e.g., $\text{std} = \sqrt{\text{var}}$), $|E(k,n)|$ represents an absolute value of the error signal 127, and a is a smoothing parameter (e.g., forgetting factor) corresponding to an amount of smoothing. While FIG. 1A and Equation [7] illustrate a specific example of the first threshold value (e.g., $\text{var}(E(k, n))$), the disclosure is not limited thereto and the first threshold value may vary without departing from the disclosure.

Using the AEC step-size parameter $V_{ssAEC}$ and/or the normalized error signal, the system 100 may determine adaptive filter coefficient values for the first adaptive filter, as shown below:

$$W(k, n+1) = W(k, n) + \mu \frac{V_{ssAEC}(k, n)E(k, n)X^*(k, n)}{\alpha \|X(k, n)\|^2 + \delta} \quad [8]$$

where p denotes a channel index associated with the playback signal(s) 112 $X(k,n)$ (e.g., individual loudspeaker 114), k denotes a tone index (e.g., frequency bin), n denotes a frame index (e.g., group of samples), $W(k, n+1)$ denotes a first adaptive filter coefficients weight vector for the pth channel index, kth tone index, and (n+1)-th frame index (e.g., updated weight vector $w_p(k, n+1)$), $W(k, n)$ denotes a second adaptive filter coefficients weight vector for the pth channel index, kth tone index, and n-th frame (e.g., previous weight vector $w_p(k, n)$), $V_{ssAEC}(k, n)$ denotes adaptation step-size values for the kth tone index and nth frame index (e.g., one or more vectors of adaptation step-size values), $\mu$ is a first tunable design parameter that represents a fixed value between zero and one (e.g., $0 \leq \mu \leq 1$), $E(k, n)$ denotes the error signal 127 for the kth tone index and nth frame index, $X^*(k, n)$ denotes a conjugate of the playback signal 112 for the kth tone index and nth frame index, a is a second tunable design parameter that corresponds to a scaling factor, $\|X(k, n)\|$ denotes a vector norm (e.g., vector length, such as a Euclidian norm) associated with the playback signal 112, and $\delta$ is a nominal value to avoid dividing by zero (e.g., regularization parameter).

In some examples, the system 100 may use the normalized error signal when adapting the first adaptive filter and determining updated filter coefficient values. For example, while Equation [8] illustrates that the system 100 may determine a first adaptive filter coefficients weight vector using the error signal $E(k,n)$, the disclosure is not limited thereto and the system 100 may determine the first adaptive filter coefficients weight vector using the normalized error signal $E_n(k, n)$ without departing from the disclosure. Thus, the system 100 may substitute the normalized error signal $E_n(k, n)$ in order to control a rate at which the adaptive filter coefficients update when the error exceeds the threshold value.

While some of the signals and/or parameters illustrated in Equation [8] are not illustrated as being specific to a channel index p, this is intended for ease of illustration and the disclosure is not limited thereto. For example, X(k, n) may refer broadly to the playback signal 112 and may encompass one or more channels (e.g., $X_1(k,n)$, $X_2(k, n)$, etc.), while $X_p(k,n)$ may refer to an individual channel of the playback signal 112 (e.g., pth channel) without departing from the disclosure. Similarly, $V_{ssAEC}(k, n)$ may refer broadly to the adaptation step-size values associated with one or more channels of the playback signal 112, while $V_{ssAEC-p}(k, n)$ may refer to a single vector of adaptation step-size values associated with an individual channel of the playback signal 112 (e.g., pth channel), although the disclosure is not limited thereto.

In some examples, the first tunable parameter μ and/or the second tunable parameter α may correspond to values between zero and one (e.g., $0 \leq \mu \leq 1$ and/or $0 \leq \alpha \leq 1$) that may be selected by the system 100 to improve a performance of the AEC component 104. To illustrate an example, the system 100 may select the first tunable parameter μ and/or the second tunable parameter α based on parameters associated with the device 102 and/or a type of device (e.g., device model), such that the first tunable parameter μ and/or the second tunable parameter α are fixed values that remain static over time. For example, the first tunable parameter μ and/or the second tunable parameter α may be optimal values determined based on device testing, simulations, and/or the like. However, the disclosure is not limited thereto, and in other examples the device 102 may collect data and iteratively change the first tunable parameter μ and/or the second tunable parameter α depending on an amount of echo leakage (e.g., echo signal represented in the error signal 127) and/or a type of echo leakage.

To illustrate an example, the device 102 may select a relatively higher value for the first tunable parameter (e.g., μ=0.9) in order to adapt more quickly (e.g., perform more aggressive adaptation) or may select a relatively lower value for the first tunable parameter (e.g., μ=0.3) in order to adapt more slowly (e.g., perform less aggressive adaptation). While Equation [8] illustrates an example that includes both the first tunable parameter μ and the second tunable parameter α, the disclosure is not limited thereto and Equation [8] may only include the first tunable parameter μ and/or the second tunable parameter α without departing from the disclosure.

Using the adaptive filter coefficient values W(k, n) and the playback signal(s) X(k, n) 112, the system 100 may determine the echo estimate signal $\hat{Y}(k, n)$, as shown below:

$$\hat{Y}(k,n) = X(k,n)W(k,n)^T \quad [9]$$

After determining the echo estimate signal $\hat{Y}(k, n)$, the system 100 may perform echo cancellation by subtracting the echo estimate signal $\hat{Y}(k, n)$ from the microphone signal(s) Y(k, n) 120 to generate the error signal E(k, n) 127.

$$E(k,n) = Y(k,n) - \hat{Y}(k,n) \quad [10]$$

FIG. 1B illustrates a high-level conceptual block diagram of echo-cancellation aspects of a multi-channel acoustic echo cancellation (AEC) system 100 in a time domain. In some examples, the system 100 may comprise a device 102 that may include acoustic echo cancellers 104, such as a first acoustic echo canceller 104a and a second acoustic echo canceller 104b, and a step-size controller 106 that controls step-size parameters used by the acoustic echo cancellers 104. While FIG. 1B only illustrates two acoustic echo cancellers 104a/104b, the disclosure is not limited thereto and the number of acoustic echo cancellers 104 may correspond to the number of microphones 118 and/or microphone signals 120 (e.g., microphone audio signals) without departing from the disclosure. While the following description refers only to the first acoustic echo canceller 104a, the concepts may be applied to any of the acoustic echo cancellers 104 without departing from the disclosure.

While not illustrated in FIG. 1B, the step-size controller 106 may receive playback signals 112 (e.g., 112a, 112b, 112c) (e.g., reference signals), microphone signal(s) 120 (e.g., 120a), estimated echo signals 123 (e.g., 123a, 123b, 123c), error signal(s) 127 (e.g., 127a), and/or other signals generated or used by the first acoustic echo canceller 104a and may determine step-size values and provide the step-size values to the first acoustic echo canceller 104a to be used by adaptive filters included in the first acoustic echo canceller 104a. In some examples, the step-size values may be determined for individual playback channels (e.g., playback signals 112), microphone channels (e.g., microphone signals 120), and/or tone indexes on a frame-by-frame basis, although the disclosure is not limited thereto. The first acoustic echo canceller 104a may use the step-size values to perform acoustic echo cancellation and generate a first error signal 127a, as will be discussed in greater detail below. Thus, the first acoustic echo canceller 104a may generate the first error signal 127a using first filter coefficients for the adaptive filters, the step-size controller 106 may use the playback signals 112 (e.g., 112a, 112b, 112c) (e.g., reference signals), the first error signal 127a, and/or other signals to determine a step-size value, and the adaptive filters may use the step-size value to generate second filter coefficients from the first filter coefficients.

As illustrated in FIG. 1B, a playback source 110 provides audio playback signals $x_1(n)$ 112a, $x_2(n)$ 112b, and $x_3(n)$ 112c, which may be referred to as reference signals 112 without departing from the disclosure. The number of reference signals 112 may correspond to a number of loudspeakers 114 associated with the system 100. For example, FIG. 1B illustrates an example in which a first reference signal $x_1(n)$ 112a is transmitted to a first loudspeaker 114a, a second reference signal $x_2(n)$ 112b is transmitted to a second loudspeaker 114b, and a third reference signal $x_3(n)$ 112c is transmitted to a third loudspeaker 114c. Each loudspeaker 114 may output the received audio, and portions of the output sounds are captured by microphones 118, illustrated in FIG. 1B as a pair of microphone 118a/118b. While FIG. 1B illustrates two microphones 118a/118b, the disclosure is not limited thereto and the system 100 may include any number of microphones 118 without departing from the present disclosure.

The portion of the sounds output by each of the loudspeakers 114a/114b/114c that reaches each of the microphones 118a/118b can be characterized based on transfer functions. FIG. 1B illustrates transfer functions $h_a(n)$ 116a, $h_b(n)$ 116b, and $h_c(n)$ 116c between the loudspeakers 114a/114b/114c (respectively) and the microphone 118a. The transfer functions 116 vary with the relative positions of the components and the acoustics of the room 10. If the position of all of the objects in a room 10 are static, the transfer functions are likewise static. Conversely, if the position of an object in the room 10 changes, the transfer functions may change.

The transfer functions (e.g., 116a, 116b, 116c) characterize the acoustic "impulse response" of the room 10 relative to the individual components. The impulse response, or impulse response function, of the room 10 characterizes the signal from a microphone when presented with a brief input signal (e.g., an audible noise), called an impulse. The impulse response describes the reaction of the system as a function of time. If the impulse response between each of the loudspeakers 116a/116b/116c is known, and the content of the reference signals $x_a(n)$ 112a, $x_b(n)$ 112b, and $x_c(n)$ 112c output by the loudspeakers 114 is known, then the transfer functions 116a, 116b, and 116c can be used to estimate the actual loudspeaker-reproduced sounds that will be received by a microphone (in this case, microphone 118a). The microphone 118a converts the captured sounds into a microphone signal $y_1(n)$ 120a. A second set of transfer functions may be associated with the second microphone 118b, which converts captured sounds into a microphone signal $y_2(n)$ 120b, although the disclosure is not limited thereto and additional sets of transfer functions may be associated with additional microphones 118 without departing from the disclosure.

The microphone signal $y_1(n)$ 120a (e.g., "echo" signal) may contain some of the reproduced sounds from the reference signals $x_a(n)$ 112a, $x_b(n)$ 112b, and $x_c(n)$ 112c, in addition to any additional sounds picked up in the room 10. Thus, the microphone signal $y_1(n)$ 120a can be expressed as:

$$y_1(n)=h_a(n)*x_a(n)+h_b(n)*x_b(n)+h_c(n)*x_c(n) \quad [11]$$

where $h_a(n)$ 116a, $h_b(n)$ 116b, and $h_c(n)$ 116c are the loudspeaker-to-microphone impulse responses in the receiving room 10, $x_a(n)$ 112a, $x_b(n)$ 112b, and $x_c(n)$ 112c are the loudspeaker reference signals, * denotes a mathematical convolution, and n denotes a frame index (e.g., group of audio samples).

The acoustic echo canceller 104a calculates estimated transfer functions 122a, 122b, and 122c, each of which model an acoustic echo (e.g., impulse response) between an individual loudspeaker 114 and an individual microphone 118. For example, a first estimated transfer function $\hat{h}_a(n)$ 122a models a first transfer function $h_a((n)$ 116a between the first loudspeaker 114a and the first microphone 118a, a second estimated transfer function $\hat{h}_b(n)$ 122b models a second transfer function $h_b(n)$ 116b between the second loudspeaker 114b and the first microphone 118a, and a third estimated transfer function $\hat{h}_c(n)$ 122c models a third transfer function $h_c(n)$ 116c between the third loudspeaker 114c and the first microphone 118a. These estimated transfer functions $\hat{h}_a(n)$ 122a, $\hat{h}_b(n)$ 122b, and $\hat{h}_c(n)$ 122c are used to produce estimated echo signals $y_a(n)$ 123a, $y_b(n)$ 123b, and $y_c(n)$ 123c, respectively.

To illustrate an example, the acoustic echo canceller 104a may convolve the reference signals 112 with the estimated transfer functions 122 (e.g., estimated impulse responses of the room 10) to generate the estimated echo signals 123. For example, the acoustic echo canceller 104a may convolve the first reference signal 112a by the first estimated transfer function $\hat{h}_a(n)$ 122a to generate the first estimated echo signal 123a, which models (e.g., represents) a first portion of the microphone signal $y_1(n)$ 120a, may convolve the second reference signal 112b by the second estimated transfer function $\hat{h}_b(n)$ 122b to generate the second estimated echo signal 123b, which models (e.g., represents) a second portion of the microphone signal $y_1(n)$ 120a, and may convolve the third reference signal 112c by the third estimated transfer function $\hat{h}_c(n)$ 122c to generate the third estimated echo signal 123c, which models (e.g., represents) a third portion of the microphone signal $y_1(n)$ 120a.

The acoustic echo canceller 104a may determine the estimated echo signals 123 using adaptive filters, as discussed in greater detail below. For example, the adaptive filters may be normalized least means squared (NLMS) finite impulse response (FIR) adaptive filters that adaptively filter the reference signals 112 using filter coefficients. Thus, the first estimated transfer function $\hat{h}_a(n)$ 122a may correspond to a first adaptive filter that generates the first estimated echo signal 123a using a first plurality of adaptive filter coefficients, the second estimated transfer function $\hat{h}_b(n)$ 122b may correspond to a second adaptive filter that generates the second estimated echo signal 123b using a second plurality of adaptive filter coefficients, and the third estimated transfer function $\hat{h}_c(n)$ 122c may correspond to a third adaptive filter that generates the third estimated echo signal 123c using a third plurality of adaptive filter coefficients. The adaptive filters may update the adaptive filter coefficients over time, such that first adaptive filter coefficient values may correspond to the first adaptive filter and a first period of time, second adaptive filter coefficient values may correspond to the first adaptive filter and a second period of time, and so on.

The estimated echo signals 123 (e.g., 123a, 123b, and 123c) may be combined by a summing component 124a to generate an estimated echo signal $\hat{y}_1(n)$ 125a corresponding to an estimate of the echo signal represented in the microphone signal $y_1(n)$ 120a (e.g., echo component of the microphone signal $y_1(n)$ 120a). The estimated echo signal can be expressed as:

$$\hat{y}_1(n)=\hat{h}_a(n)*x_a(n)+\hat{h}_b(n)*x_b(n)+\hat{h}_c(n)*x_c(n) \quad [12]$$

where * again denotes convolution. A canceler component 126a may subtract the estimated echo signal 125a from the microphone signal 120a to produce the first error signal $e_1(n)$ 127a. Specifically:

$$e_1(n)=y_1(n)-\hat{y}_1(n) \quad [13]$$

The system 100 may perform acoustic echo cancellation for each microphone 118 (e.g., 118a and 118b) to generate error signals 127 (e.g., 127a and 127b). Thus, the first acoustic echo canceller 104a corresponds to the first microphone 118a and generates a first error signal $e_1(n)$ 127a, the second acoustic echo canceller 104b corresponds to the second microphone 118b and generates a second error signal $e_2(n)$ 127b, and so on for each of the microphones 118. The first error signal $e_1(n)$ 127a and the second error signal $e_2(n)$ 127b (and additional error signals for additional microphones) may be collectively referred to as the error signal e(n) 127 and output by audio output 128. While FIG. 1B illustrates the first acoustic echo canceller 104a and the second acoustic echo canceller 104b as discrete components, the disclosure is not limited thereto and the first acoustic echo canceller 104a and the second acoustic echo canceller 104b may be included as part of a single acoustic echo canceller 104.

In some examples, the acoustic echo canceller 104a may calculate frequency domain versions of the estimated transfer functions $\hat{h}_a((n)$ 122a, $\hat{h}_b(n)$ 122b, and $\hat{h}_c(n)$ 122c using short term adaptive filter coefficients W(k,r) that are used by adaptive filters, as described above with regard to Equation [8]. In conventional AEC systems operating in the time domain, the adaptive filter coefficients are derived using least mean squares (LMS), normalized least mean squares (NLMS) or stochastic gradient algorithms, which use an instantaneous estimate of a gradient to update an adaptive weight vector at each time step. With this notation, the LMS algorithm can be iteratively expressed in the usual form:

$$h_{new} = h_{old} + \mu * e * x \qquad [14]$$

where $h_{new}$ is an updated transfer function, $h_{old}$ is a transfer function from a prior iteration, is the step-size between samples, e is an error signal, and x is a reference signal. For example, the first acoustic echo canceller 104a may generate the first error signal 127a using first filter coefficients for the adaptive filters (corresponding to a previous transfer function $h_{old}$), the step-size controller 106 may use the first error signal 127a to determine a step-size value μ, and the adaptive filters may use the step-size value μ to generate second filter coefficients from the first filter coefficients (corresponding to a new transfer function $h_{new}$). Thus, the adjustment between the previous transfer function $h_{old}$ and new transfer function $h_{new}$ is proportional to the step-size value μ. If the step-size value is closer to one or greater than one, the adjustment is larger, whereas if the step-size value is closer to zero, the adjustment is smaller.

Applying such adaptation over time (i.e., over a series of samples), it follows that the error signal "e" (e.g., 127a) should eventually converge to zero for a suitable choice of the step-size μ (assuming that the sounds captured by the microphone 118a correspond to sound entirely based on the references signals 112a, 112b, and 112c rather than additional ambient noises, such that the estimated echo signal $\hat{y}_1(n)$ 125a cancels out the microphone signal $y_1(n)$ 120a). However, e→0 does not always imply that h−ĥ→0, where the estimated transfer function ĥ cancelling the corresponding actual transfer function h is the goal of the adaptive filter. For example, the estimated transfer functions ĥ may cancel a particular string of samples, but is unable to cancel all signals, e.g., if the string of samples has no energy at one or more frequencies. As a result, effective cancellation may be intermittent or transitory. Having the estimated transfer function h approximate the actual transfer function h is the goal of single-channel echo cancellation, and becomes even more critical in the case of multichannel echo cancellers that require estimation of multiple transfer functions.

In order to perform acoustic echo cancellation, the time domain microphone signal y(n) 120 and the time domain reference signal x(n) 112 may be adjusted to remove a propagation delay and align the microphone signal y(n) 120 with the reference signal x(n) 112. The system 100 may determine the propagation delay using techniques known to one of skill in the art and the microphone signal y(n) 120 is assumed to be aligned for the purposes of this disclosure. For example, the system 100 may identify a peak value in the reference signal x(n) 112, identify the peak value in the microphone signal y(n) 120 and may determine a propagation delay based on the peak values.

The acoustic echo canceller(s) 104 may use short-time Fourier transform-based frequency-domain acoustic echo cancellation (STFT AEC) to determine step-size. The following high level description of STFT AEC refers to microphone signal y(n) 120, which is a time-domain signal output from a microphone 118 that may comprise an echo from at least one loudspeaker 114. The reference signal x(n) 112 is a time-domain audio signal that is sent to and output by a loudspeaker 114. The variables X(k,n) and Y(k,n) correspond to a Short Time Fourier Transform of x(n) and y(n) respectively, and thus represent frequency-domain signals. A short-time Fourier transform (STFT) is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index.

Figure 2A:
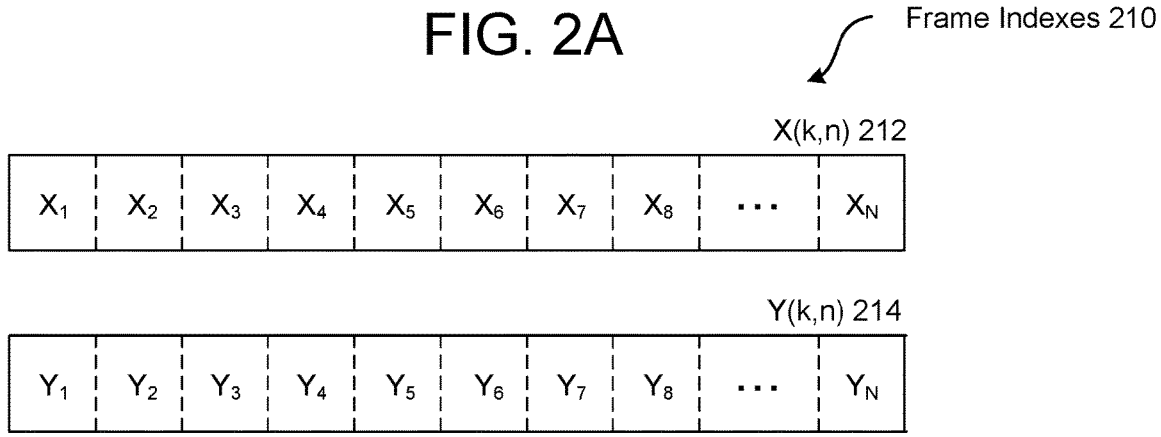
FIGS. 2A to 2C illustrate examples of channel indexes, tone indexes and frame indexes.

FIG. 2A illustrates an example of frame indexes 210 including reference values X(k,n) 212 and input values Y(k,n) 214. For example, the AEC 104 may apply a short-time Fourier transform (STFT) to the time-domain reference signal x(n) 112, producing the frequency-domain reference values X(k,n) 212, where the tone index k ranges from 0 to K and n denotes a frame index ranging from 0 to N. The AEC 104 may also apply an STFT to the time domain microphone signal y(n) 120, producing frequency-domain input values Y(k,n) 214. As illustrated in FIG. 2A, the history of the values across iterations is provided by the frame index n, which ranges from 1 to N and represents a series of samples over time.

Figure 2B:
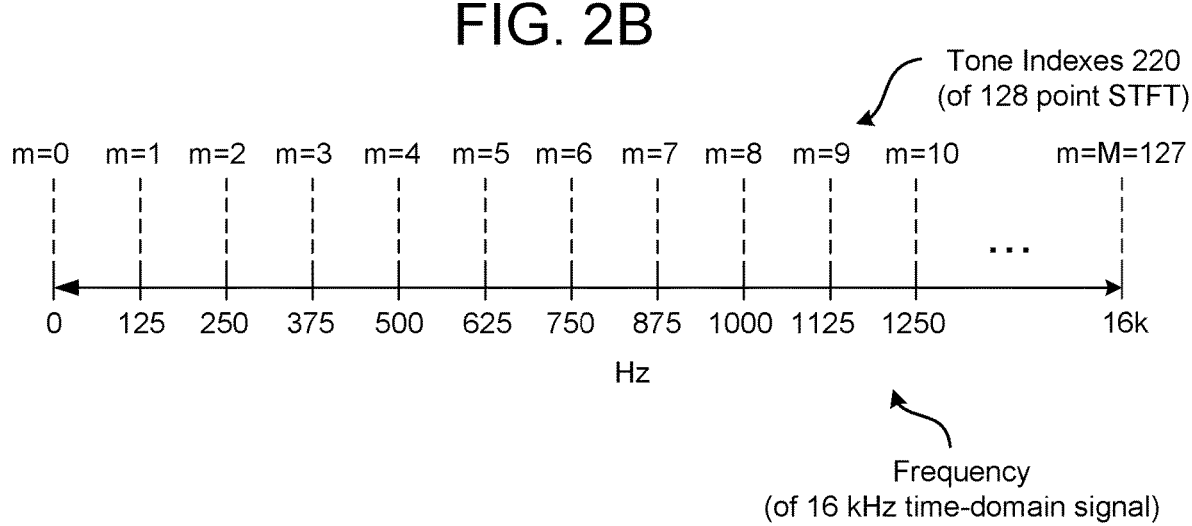
Figure 2C:
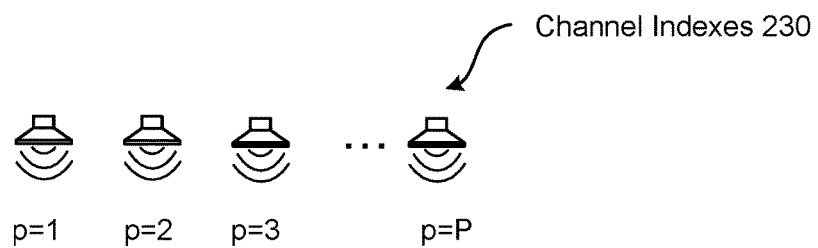

FIG. 2B illustrates an example of performing an K-point STFT on a time-domain signal. As illustrated in FIG. 2B, if a 128-point STFT is performed on a 16 kHz time-domain signal, the output is 128 complex numbers, where each complex number corresponds to a value at a frequency in increments of 16 kHz/128, such that there is 125 Hz between points, with point 0 corresponding to 0 Hz and point 127 corresponding to 16 kHz. As illustrated in FIG. 2B, each tone index 220 in the 128-point STFT corresponds to a frequency range (e.g., subband) in the 16 kHz time-domain signal. While FIG. 2B illustrates the frequency range being divided into 128 different subbands (e.g., tone indexes), the disclosure is not limited thereto and the system 100 may divide the frequency range into K different subbands without departing from the disclosure. While FIG. 2B illustrates the tone index 220 being generated using a Short-Time Fourier Transform (STFT), the disclosure is not limited thereto. Instead, the tone index 220 may be generated using Fast Fourier Transform (FFT), generalized Discrete Fourier Transform (DFT) and/or other transforms known to one of skill in the art (e.g., discrete cosine transform, non-uniform filter bank, etc.).

Given a signal z(n), the STFT Z(k,n) of z(n) is defined by:

$$Z(k,n) = \sum_{m=0}^{K-1} Win(m) * z(m+n*\mu) * e^{-2pi*k*m/K} \qquad [15.1]$$

where, Win(m) is a window function for analysis, k is a frequency index, n is a frame index, is a step-size (e.g., hop size), and K is an FFT size. Hence, for each block (at frame index n) of M samples, the STFT is performed which produces K complex tones X(k,n) corresponding to tone index k and frame index n.

Referring to the microphone signal y(n) 120 from the microphone 118, Y(k,n) may have a frequency domain STFT representation:

$$Y(k,n) = \sum_{m=0}^{K-1} Win(m) * y(m+n*\mu) * e^{-2pi*k*m/K} \qquad [15.2]$$

Referring to the reference signal x(n) 112 to the loudspeaker 114, X(k,n) may have a frequency domain STFT representation:

$$X(k,n) = \sum_{m=0}^{K-1} Win(m) * x(m+n*\mu) * e^{-2pi*k*m/K} \quad [15.3]$$

The system 100 may determine the number of tone indexes 220 and the step-size controller 106 may determine a step-size value μ for each tone index 220 (e.g., subband). Thus, the frequency-domain reference values X(k,n) 212 and the frequency-domain input values Y(k,n) 214 are used to determine individual step-size parameters μ(k) for each tone index k, generating individual step-size values on a frame-by-frame basis. For example, for a first frame index "1," the step-size controller 106 may determine a first step-size parameter μ(k) for a first tone index "k," a second step-size parameter μ(k+1) for a second tone index "k+1," a third step-size parameter μ(k+2) for a third tone index "k+2" and so on. The step-size controller 106 may determine updated step-size parameters μ(k) for a second frame index "2" (e.g., n+1), a third frame index "3" (e.g., n+2), and so on.

As illustrated in FIG. 1B, the system 100 may be a multi-channel AEC (MC-AEC), with a first channel p (e.g., reference signal 112a) corresponding to a first loudspeaker 114a, a second channel (p+1) (e.g., reference signal 112b) corresponding to a second loudspeaker 114b, and a third channel (p+2) (e.g., reference signal 112c) corresponding to a third loudspeaker 114c. While FIG. 1B illustrates an example involving three loudspeakers 114a-114c, the disclosure is not limited thereto and the MC-AEC include additional channels without departing from the disclosure. For example, FIG. 2A illustrates channel indexes 230 that may include a plurality of channels from channel p to channel P, such that the MC-AEC would include additional channels until a final channel (P) corresponding to a final loudspeaker 114P). Thus, while FIG. 1B only illustrates three channels (e.g., reference signals 112a-112c), the disclosure is not limited thereto and the number of channels may vary. For the purposes of discussion, an example of system 100 may include P loudspeakers 114 (where P>1) and a separate microphone array system (microphones 118) for hands free near-end/far-end MC-AEC applications.

For each channel of the channel indexes (e.g., for each loudspeaker 114), the step-size controller 106 may perform the steps discussed above to determine a step-size value for each tone index 220 on a frame-by-frame basis. Thus, a first reference frame index 212a and a first input frame index 214a corresponding to a first channel may be used to determine a first plurality of step-size values, a second reference frame index 212b and a second input frame index 214b corresponding to a second channel may be used to determine a second plurality of step-size values, and so on. The step-size controller 106 may provide the step-size values to adaptive filters for updating filter coefficients used to perform the acoustic echo cancellation (AEC). For example, the first plurality of step-size values may be provided to first AEC 104a, the second plurality of step-size values may be provided to second AEC 104b, and so on. The first AEC 104a may use the first plurality of step-size values to update filter coefficients from previous filter coefficients, as discussed above with regard to Equation 4. For example, an adjustment between the previous transfer function $h_{old}$ and new transfer function $h_{new}$ is proportional to the step-size value (e.g., μ). If the step-size value is closer to one or greater than one, the adjustment is larger, whereas if the step-size value is closer to zero, the adjustment is smaller.

Calculating the step-size values for each channel/tone index/frame index allows the system 100 to improve steady-state error, reduce a sensitivity to local speech disturbance and improve a convergence rate of the AEC 104. For example, the step-size value may be increased when the error signal 127 increases (e.g., the microphone signal 120 and the estimated echo signal 125 diverge) to increase a convergence rate and reduce a convergence period. Similarly, the step-size value may be decreased when the error signal 127 decreases (e.g., the microphone signal 120 and the estimated echo signal 125 converge) to reduce a rate of change in the transfer functions and therefore more accurately estimate the estimated echo signal 125.

Figure 3:
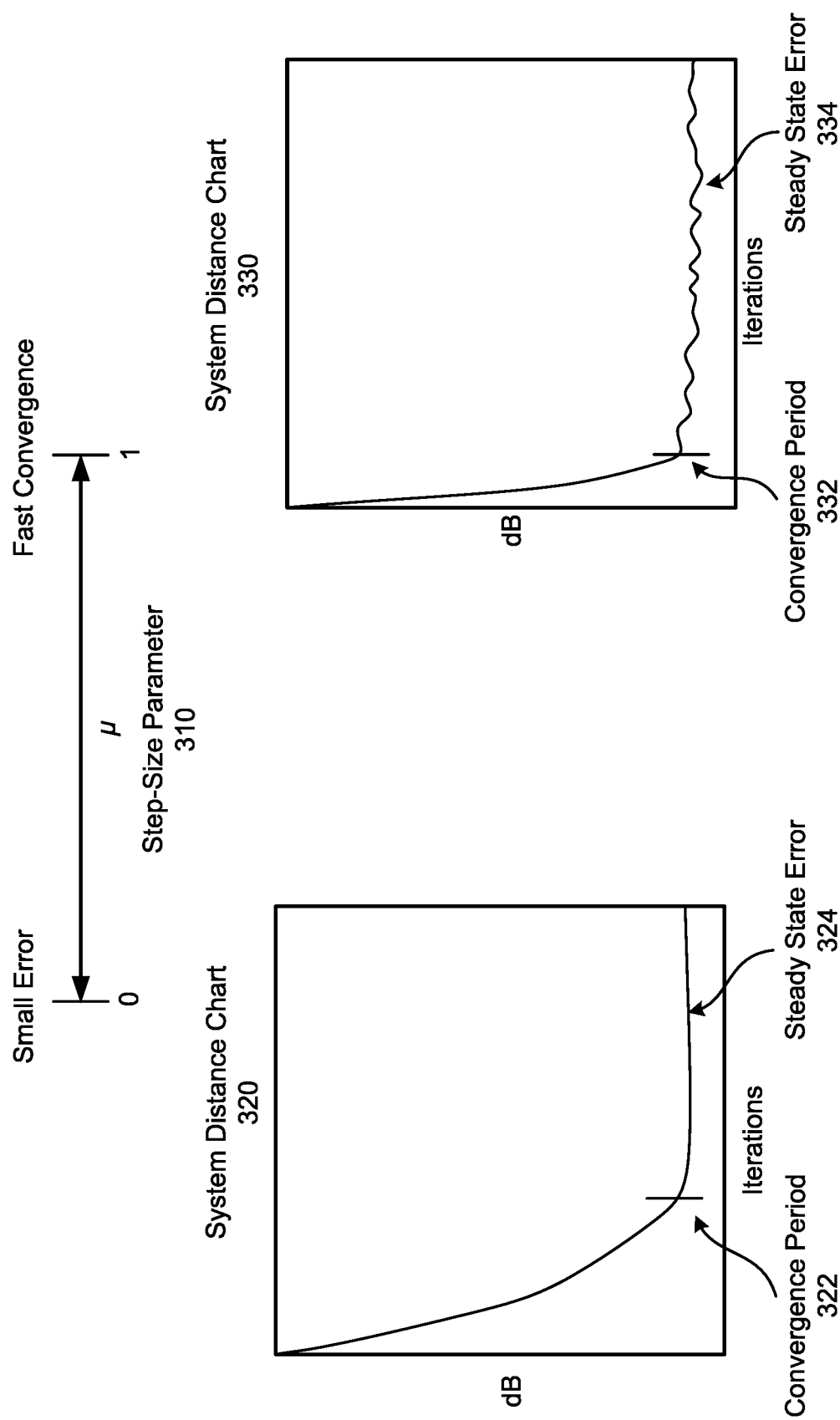
FIG. 3 illustrates examples of convergence periods and steady state error associated with different step-size parameters.

FIG. 3 illustrates examples of convergence periods and steady state error associated with different step-size parameters. As illustrated in FIG. 3, a step-size parameter 310 may vary between a lower bound (e.g., 0) and an upper bound (e.g., 1). A system distance measures the similarity between the estimated impulse response and the true impulse response. Thus, a relatively small step-size value corresponds to system distance chart 320, which has a relatively long convergence period 322 (e.g., time until the estimated echo signal 125 matches the microphone signal 120) but relatively low steady state error 324 (e.g., the estimated echo signal 125 accurately estimates the microphone signal 120). In contrast, a relatively large step-size value corresponds to system distance chart 330, which has a relatively short convergence period 332 and a relatively large steady state error 334. While the large step-size value quickly matches the estimated echo signal 125 to the microphone signal 120, the large step-size value prevents the estimated echo signal 125 from accurately estimating the microphone signal 120 over time due to misadjustments caused by noise sensitivity and/or near-end speech (e.g., speech from a speaker in proximity to the microphone 118).

FIG. 4 illustrates an example of a convergence period and steady state error when a step-size parameter is controlled dynamically according to embodiments of the present disclosure. As illustrated in FIG. 4, the system 100 may control a step-size value of a dynamic step-size parameter 400 over multiple iterations, ranging from an initial step-size value of one to improve convergence rate down to a smaller step-size value to prevent misadjustments. System distance chart 410 illustrates the effect of the dynamic step-size parameter 400, which has a relatively short convergence period 412 and relatively low steady state error 414.

While FIG. 4 illustrates a static environment where the system 100 controls the dynamic step-size parameter 400 from an initial state to a steady-state, a typical environment is dynamic and changes over time. For example, objects in the room 10 may move (e.g., a speaker may step in front of a loudspeaker 114 and/or microphone 118) and change an echo path, ambient noise (e.g., conversation levels, external noises or intermittent noises or the like) in the room 10 may vary and/or near-end speech (e.g., speech from a speaker in proximity to the microphone 118) may be present. The system 100 may dynamically control the step-size parameter to compensate for these fluctuations in environment and/or echo path.

For example, when the system 100 begins performing AEC, the system 100 may control step-size values to be large in order for the system 100 to learn quickly and match the estimated echo signal to the microphone signal (e.g., microphone audio signal). As the system 100 learns the impulse responses and/or transfer functions, the system 100 may reduce the step-size values in order to reduce the error signal and more accurately calculate the estimated echo signal so that the estimated echo signal matches the microphone signal. In the absence of an external signal (e.g., near-end speech), the system 100 may converge so that the estimated echo signal closely matches the microphone signal and the step-size values become very small. If the echo path changes (e.g., someone physically stands between a loudspeaker 114 and a microphone 118), the system 100 may increase the step-size values to learn the new acoustic echo. In the presence of an external signal (e.g., near-end speech), the system 100 may decrease the step-size values so that the estimated echo signal is determined based on previously learned impulse responses and/or transfer functions and the system 100 outputs the near-end speech.

Additionally or alternatively, the step-size values may be distributed in accordance with the reference signals 112. For example, if one channel (e.g., reference signal 112a) is significantly louder than the other channels, the system 100 may increase a step-size value associated with the reference signal 112a relative to step-size values associated with the remaining reference signals 112. Thus, a first step-size value corresponding to the reference signal 112a will be relatively larger than a second step-size value corresponding to the reference signal 112b.

Figure 5:
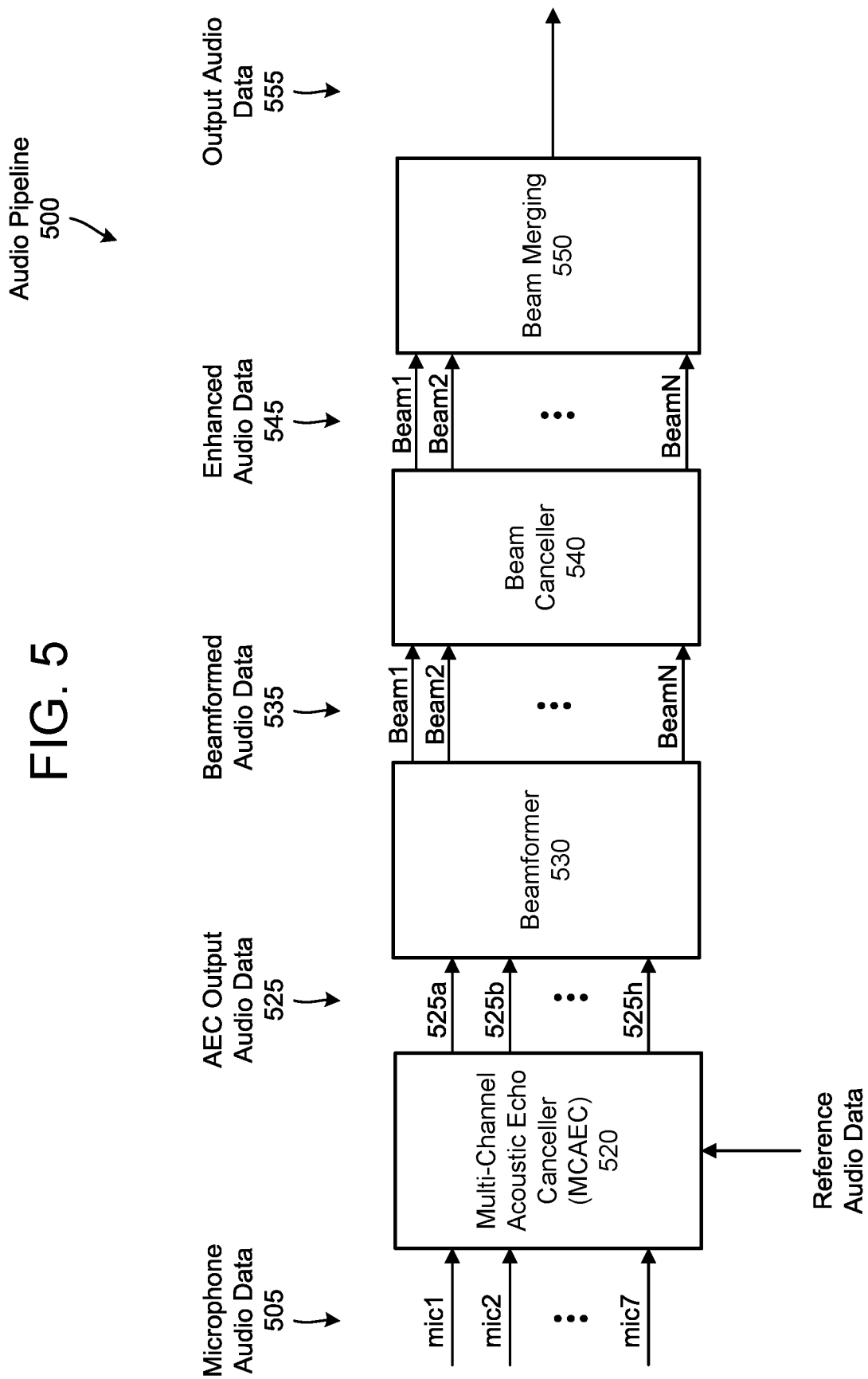
FIG. 5 illustrates a component diagram for an audio pipeline according to embodiments of the present disclosure.

FIG. 5 illustrates a component diagram for an audio pipeline according to embodiments of the present disclosure. As illustrated in FIG. 5, an audio pipeline 500 may include audio processing components configured to perform a variety of audio processing to isolate the desired speech and generate output audio data. For example, the audio processing components may include a multi-channel acoustic echo canceller (MCAEC) 520 component configured to perform echo cancellation to remove an echo signal from the microphone audio data. After performing echo cancellation, the audio processing components may include a beamformer component 530, beam canceller component 540, and a beam merging component 550, although the disclosure is not limited thereto.

As illustrated in FIG. 5, the MCAEC component 520 may receive microphone audio data 505 (e.g., mic1, mic2, . . . micM) from the microphones 118 and may be configured to perform echo cancellation to generate AEC output audio data 525. As the audio pipeline 500 is configured to process microphone audio data 505 generated by multiple microphones, the audio pipeline 500 includes the MCAEC component 520 configured to perform multi-channel echo cancellation. For example, the MCAEC component 520 may receive microphone audio data 505 (e.g., microphone audio data $x_m(t)$) from two or more microphones 118 and may perform echo cancellation individually for each of the microphones 118. Thus, the microphone audio data 505 may include an individual channel for each microphone, such as a first channel mic associated with a first microphone 118a, a second channel mic2 associated with a second microphone 118b, and so on until a final channel micM associated with an M-th microphone 118m. While FIG. 5 illustrates an example in which the microphone audio data 505 includes seven microphone channels, the disclosure is not limited thereto and the number of microphone channels may vary without departing from the disclosure.

Similarly, the MCAEC component 520 may receive reference audio data 515 (e.g., playback audio data $x_r(t)$) associated with one or more loudspeakers 114 of the device 102. In some examples, the reference audio data 515 may correspond to a single loudspeaker 114, such that the reference audio data 515 only includes a single channel. However, the disclosure is not limited thereto, and in other examples the reference audio data 515 may correspond to multiple loudspeakers 114 without departing from the disclosure. For example, the reference audio data 515 may include five separate channels, such as a first channel corresponding to a first loudspeaker 114a (e.g., woofer), a second channel corresponding to a second loudspeaker 114b (e.g., tweeter), and three additional channels corresponding to three additional loudspeakers 114c-114e (e.g., midrange) without departing from the disclosure. The disclosure is not limited thereto, however, and the number of loudspeakers may vary without departing from the disclosure.

In some examples, the reference signal may correspond to playback audio data used to generate output audio. For example, the device 102 may receive the playback audio data and may generate output audio by sending the playback audio data to one or more loudspeaker(s) 114 associated with the device 102. Thus, the AEC component 520 may receive the playback audio data (e.g., reference audio data 515) and may use adaptive filters to generate the reference signal, which corresponds to an estimated echo signal represented in the microphone audio data 505. By subtracting the reference signal from the microphone audio data 505, the MCAEC component 520 may remove at least a portion of the echo signal and isolate local speech represented in the microphone audio data 505. For example, the MCAEC component 520 may generate a first channel of AEC output audio data 525a corresponding to the first microphone 118a, a second channel of AEC output audio data 525b corresponding to the second microphone 118b, and so on. Thus, the device 102 may process the individual channels separately.

As illustrated in FIG. 5, in some examples the audio pipeline 500 may include a beamformer component 530 that may receive the AEC output audio data 525 and perform beamforming to generate beamformed audio data 535. To illustrate an example, the beamformer component 530 may generate directional audio data corresponding to N unique directions (e.g., N unique beams, such as [Beam1, Beam2, . . . BeamN]). For example, the beamformed audio data 535 may comprise a plurality of audio signals that includes a first audio signal corresponding to a first direction, a second audio signal corresponding to a second direction, a third audio signal corresponding to a third direction, and so on. The number of unique directions may vary without departing from the disclosure, and may be similar or different from the number of microphones 118.

As described above, the device 102 may include a first number of microphones (e.g., A) and generate a second number of beams (e.g., N). However, the disclosure is not limited thereto and the device 102 may include any number of microphone channels and generate any number of beams without departing from the disclosure. Thus, the first number of microphones (e.g., M) and the second number of beams (e.g., N) may be the same or different without departing from the disclosure. Additionally or alternatively, while FIG. 5 illustrates the beamformer component 530 performing beamforming processing on the AEC output audio data 525, the disclosure is not limited thereto. In some examples, the beamformer component 530 may perform beamforming processing on the microphone audio data 505 without departing from the disclosure.

In the example illustrated in FIG. 5, the beamformer component 530 may correspond to a Fixed Beamformer (FBF) component and may be followed by beam canceller component 540, which may correspond to an adaptive beamformer (ABF) component, although the disclosure is not limited thereto. The beam canceller component 540 may be configured to perform beam to beam cancellation using the beamformed audio data 535 to generate enhanced audio data 545. In order to isolate desired speech, the beam canceller component 540 may dynamically select target signal(s) and/or reference signal(s). Thus, in some examples the target signal(s) and/or the reference signal(s) may be continually changing over time based on speech, acoustic noise(s), ambient noise(s), and/or the like in an environment around the device 102. For example, the beam canceller component 540 may select the target signal(s) by detecting speech, based on signal strength values or signal quality metrics (e.g., signal-to-noise ratio (SNR) values, average power values, etc.), and/or using other techniques or inputs, although the disclosure is not limited thereto.

As an example of other techniques or inputs, the device 102 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the beam canceller component 540 may vary, resulting in different filter coefficient values over time.

As illustrated in FIG. 5, a beam merging component 550 may receive the enhanced audio data 545 and generate output audio data 555. In some examples, the beam merging component 550 may select portions of the enhanced audio data 545 (e.g., enhanced directional audio data) corresponding to two or more directions and generate the output audio data 555 using a weighted sum that combines these portions of the enhanced audio data 545.

While FIG. 5 illustrates an example of the audio pipeline 500 including the beamformer component 530 and the beam canceller component 540, the disclosure is not limited thereto. In some examples, the beamformer component 530 may correspond to a Fixed Beamformer (FBF) component configured to generate directional audio data in a plurality of directions, while the beam canceller component 540 may correspond to an Adaptive Beamformer (ABF) component configured to perform adaptive beamforming and generate the enhanced audio data 545, although the disclosure is not limited thereto.

While FIG. 5 illustrates the audio pipeline 500 processing each of the microphone channels independently, the disclosure is not limited thereto. In some examples, the audio pipeline 500 may process only a portion of the microphone channels (e.g., the AEC output audio data 525 only corresponds 1-3 channels) and/or combine the multiple microphone channels into a single output (e.g., the AEC output audio data 525 corresponds to a single channel) without departing from the disclosure.

As part of beam merging, the device 102 may merge a set of neighboring beams while maintaining temporal continuity between frames. For example, the device 102 may define a first number (e.g., C) of beam groups, such that each beam group c contains multiple beams that are spatially close to each other. Using the pre-defined set of beam groups that contain spatially close beams, the device 102 may eliminate or reduce a number of disjointed transitions that may cause distortion in the output signal. In addition, the device 102 may use a weight/gain parameter to introduce a bias for preferable directions (e.g., directions likely to correspond to the user) based on a relative position of the device 102. These weight/gain parameters may also provide an additional preference for certain beam groups over other beam groups based on a typical implementation of the device 102, although the disclosure is not limited thereto.

As will be described in greater detail below, the device 102 may perform beam merging by identifying a beam group with the highest overall SNR plus gain value (e.g., gain parameter is multiplied with the corresponding beam group during SNR estimation), determining normalized weights based on a weighted sum calculated using the SNR and noise floor ratio values, and generating the single-channel output audio data 555 by applying the normalized weights to the selected beam group.

In some examples, the device 102 may determine beam-specific signal quality metrics corresponding to a minimum noise floor for each beam and use these signal quality metrics to select a beam group and perform beam merging to generate a combined output signal. For example, the device 102 may track a minimum noise floor for each beam over time, determine a highest minimum noise floor across the beams, and determine a noise floor ratio between the beam-specific minimum noise floor and the highest minimum noise floor. Using a combination of the noise floor ratio and signal-to-noise ratio (SNR) values, the device 102 may perform beam selection by prioritizing low background noise as well as high SNR to select a pre-defined beam group. In addition, the device 102 may use the noise floor ratio to perform beam merging and generate single-channel output audio data using the selected beam group. For example, the device 102 may scale the beams based on a combination of the SNR value and the noise floor ratio, such that the combined output includes a percentage of the selected beams based on a weighted sum corresponding to a magnitude of the beam and the relative noise floor.

Figure 6:
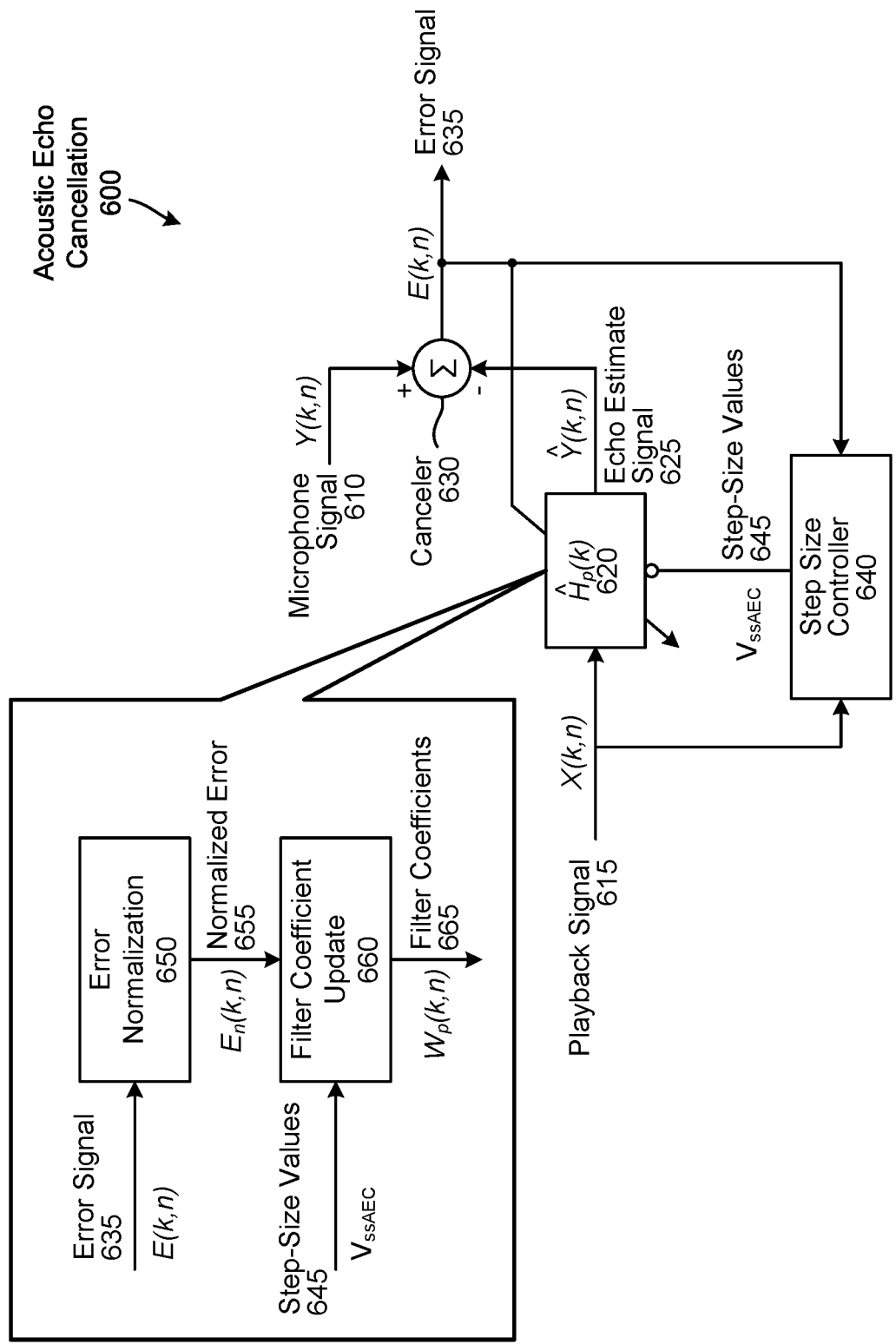
FIG. 6 illustrates an example component diagram for performing acoustic echo cancellation according to embodiments of the present disclosure.

FIG. 6 illustrates an example component diagram for performing echo cancellation according to embodiments of the present disclosure. As illustrated in FIG. 6, the system 100 may perform acoustic echo cancellation 600 using a microphone signal Y(k, n) 610 (e.g., microphone audio signal) and a playback signal X(k, n) 615 (e.g., reference audio signal). As described above, an estimated transfer function $\hat{H}_p(k)$ 620 may model or represent an acoustic echo (e.g., impulse response) between an individual loudspeaker 114 and an individual microphone 118. For example, the transfer function $\hat{H}_p(k)$ 620 may correspond to a first plurality of adaptive filter coefficient values associated with a first adaptive filter and the system 100 may use the first plurality of adaptive filter coefficient values to process the playback signal X(k, n) 615 and generate an echo estimate signal $\hat{Y}(k, n)$ 625. To perform echo cancellation, the system 100 may subtract the echo estimate signal $\hat{Y}(k,n)$ 625 from the microphone signal Y(k,n) 610 to generate an error signal E(k, n) 635.

For ease of illustration, FIG. 6 illustrates an example of performing echo cancellation involving a single microphone signal Y(k, n) 610 and a single playback signal X(k, n) 615. However, the disclosure is not limited thereto and the components and/or steps illustrated in FIG. 6 may be repeated for two or more playback signals $X_p(k, n)$ 615 and/or two or more microphone signals $Y_p(k,n)$ 610 without departing from the disclosure, as described in greater detail above with regard to FIG. 1B.

As illustrated in FIG. 6, in some examples the system 100 may perform echo cancellation in the subband domain, which helps the system 100 exert both time and frequency dependent adaptation controls. For example, the audio signals are represented in FIG. 6 with reference to a tone index k and a frame index n (e.g., X(k, n), Y(k, n), $\hat{Y}(k, n)$, E(k, n)). However, the disclosure is not limited thereto and the system 100 may perform one or more steps associated with echo cancellation in the time domain (e.g., represented as x(n), y(n), ŷ(n), e(n)) and/or the frequency domain without departing from the disclosure.

As the system 100 performs echo cancellation in the subband domain, the system 100 may determine the echo estimate signal Ŷ(k, n) 625 using an adaptive filter coefficients weight vector:

$$W_p(k,n) \triangleq [W_p^0(k,n) W_p^1(k,n) \ldots W_p^{L-1}(k,n)] \quad [16]$$

where p denotes a channel index associated with the playback signal 615 (e.g., individual loudspeaker 114), k denotes a tone index (e.g., frequency bin, subband bin, etc.), n denotes a frame index (e.g., group of samples), L denotes a length of the room impulse response (RIR), and $W_p^l(k, n)$ denotes a particular weight value at the pth channel for the kth tone, the nth frame, and the lth time step.

Using the adaptive filter coefficients weight vector $W_p(k, n)$, the system 100 may determine the echo estimate signal 625 Ŷ(k, n) using the following equation:

$$\hat{Y}_p(k,n) = \Sigma_{r=0}^{L-1} X_p(k,n-r) W_p^r(k,n) \quad [17]$$

where $\hat{Y}_p(k, n)$ is the echo estimate of the pth channel for the kth tone index and nth frame index, $X_p(k, n)$ is the playback signal (e.g., reference signal) for the pth channel, and $W_p^r(k, n)$ denotes the adaptive filter coefficients weight vector.

During conventional processing, the weight vector can be updated according to a subband normalized least mean squares (NLMS) algorithm:

$$W_p(k, n) = W_p(k, n-1) + \mu_p(k, n) \cdot \frac{X_p(k, n)}{\|X_p(k, n)\|^2 + \xi} \cdot E^*(k, n) \quad [18]$$

where $W_p(k, n)$ denotes an adaptive filter coefficients weight vector for the pth channel, kth tone index, and nth frame index, $\mu_p(k, n)$ denotes an adaptation step-size value, $X_p(k, n)$ denotes the playback signal 615 (e.g., reference signal) for the pth channel, $\|X_p(k, n)\|$ denotes a vector norm (e.g., vector length, such as a Euclidian norm) associated with the playback signal 615, $\xi$ is a nominal value to avoid dividing by zero (e.g., regularization parameter), and E*(k,n) denotes a conjugate of the error signal 635 output by the canceller 630.

While Equation [18] illustrates an example of updating the adaptive filter coefficients weight vector, this is a generalized version of the NLMS algorithm and the disclosure is not limited thereto. For example, Equation [18] is similar to Equation [8], which was described in greater detail above, except that the adaptation step-size parameter $\mu_p(k, n)$ included in Equation [18] is replaced by adaptation step-size values $V_{ssAEC}(k, n)$, a first tunable parameter µ, and/or a second tunable parameter α in Equation [8]. Thus, while both Equation [8] and Equation [18] may be used to update adaptive filter coefficients, the disclosure refers to updating the adaptation step-size values $V_{ssAEC}(k, n)$ and examples are described with regard to the system 100 performing adaptation using Equation [8].

Using the equations described above, the system 100 may adapt the first adaptive filter by updating the first plurality of filter coefficient values to a second plurality of filter coefficient values using the error signal 635. For example, the system 100 may update the weight vector associated with the first adaptive filter using Equation [8] in order adjust the echo estimate signal 625 and minimize the error signal 635. Applying such adaptation over time (i.e., over a series of samples), it follows that the error signal 635 should eventually converge to zero for a suitable choice of the step-size $V_{ssAEC}(k, n)$ in the absence of ambient noises or near-end signals (e.g., all audible sounds captured by the microphone 118a corresponds to the playback signals 112). The rate at which the system 100 updates the first adaptive filter is proportional to the step-size values $V_{ssAEC}(k, n)$. If a step-size value $V_{ssAEC}(k, n)$ is closer to one or greater than one, the adjustment is larger, whereas if the step-size value $V_{ssAEC}(k, n)$ is closer to zero, the adjustment is smaller.

When a near-end signal (e.g., near-end speech or other audible sound that doesn't correspond to the playback signals 112) is present, however, the system 100 should output the near-end signal, which requires that the system 100 not update the first adaptive filter quickly enough to cause the adaptive filter to diverge from a converged state (e.g., cancel the near-end signal). For example, the near-end signal may correspond to near-end speech, which is a desired signal and the system 100 may process the near-end speech and/or output the near-end speech to downstream components for speech processing or the like. Alternatively, the near-end signal may correspond to an impulsive noise, which is not a desired signal but passes quickly, such that adapting causes the echo cancellation to diverge from a steady state condition.

To improve echo cancellation, the system 100 may control an adaptation speed of the first adaptive filter by dynamically determining the step-size values $V_{ssAEC}(k, n)$ and/or performing error normalization to limit the rate of adaptation. As illustrated in FIG. 6, the system 100 may determine step-size values $V_{ssAEC}(k, n)$ 645 using a step-size controller component 640 according to embodiments of the present disclosure. As will be described in greater detail below with regard to FIG. 8, the system 100 may determine the step-size values $V_{ssAEC}(k, n)$ 645 using a combination of a microphone step-size value $V_{ssmics}(k,n)$ and a reference step-size value $V_{ssrefs}(k, n)$. For example, the system 100 may multiply a microphone step-size value $V_{ssmics}(k, n)$ and a reference step-size value $V_{ssrefs}(k, n)$ to calculate a scalar value and then map the scalar value to a step-size value $V_{ssAEC}(k, n)$ 645 (e.g., using a sigmoid curve or the like) without departing from the disclosure. However, the disclosure is not limited thereto, and in other examples the system 100 may map the microphone step-size value $V_{ssmics}(k, n)$ to a first scalar value (e.g., using a first sigmoid curve), map the reference step-size value $V_{ssrefs}(k, n)$ to a second scalar value (e.g., using a second sigmoid curve), and then calculate the step-size value $V_{ssAEC}(k, n)$ 645 using the first scalar value and the second scalar value, although the disclosure is not limited thereto.

In some examples, a step-size value $V_{ssAEC}(k, n)$ 645 may only be relatively high (e.g., $0.5 \leq V_{ssAEC}(k, n) \leq 1.0$) when both the microphone step-size value $V_{ssmics}(k, n)$ and the reference step-size value $V_{ssrefs}(k, n)$ are relatively high values. For example, if either the microphone step-size value $V_{ssmics}(k, n)$ or the reference step-size value $V_{ssrefs}(k, n)$ is low, a corresponding step-size value $V_{ssAEC}(k, n)$ 645 is therefore low and the first adaptive filter adapts slowly. Thus, the first adaptive filter adapts quickly only when the reference step-size value $V_{ssrefs}(k,n)$ is relatively high (e.g., indicating that the reference signal level is near an upper boundary of recent reference values) and the microphone step-size value $V_{ssmics}(k,n)$ is relatively high (e.g., indicating that the microphone signal level is near an upper boundary of recent microphone values). Thus, the step-size value $V_{ssAEC}(k, n)$ 645 prevents the device 102 from diverging due to low level signals represented in either the microphone signal(s) 120 Y(k, n) or the playback signal(s) X(k, n) 112.

As illustrated in FIG. 6, the step-size controller component 640 may receive the playback signal 615 and the error signal 635 and may determine the step-size values $V_{ssAEC}$(k, n) 645, which will be described in greater detail below with regard to FIG. 8.

Figure 7:
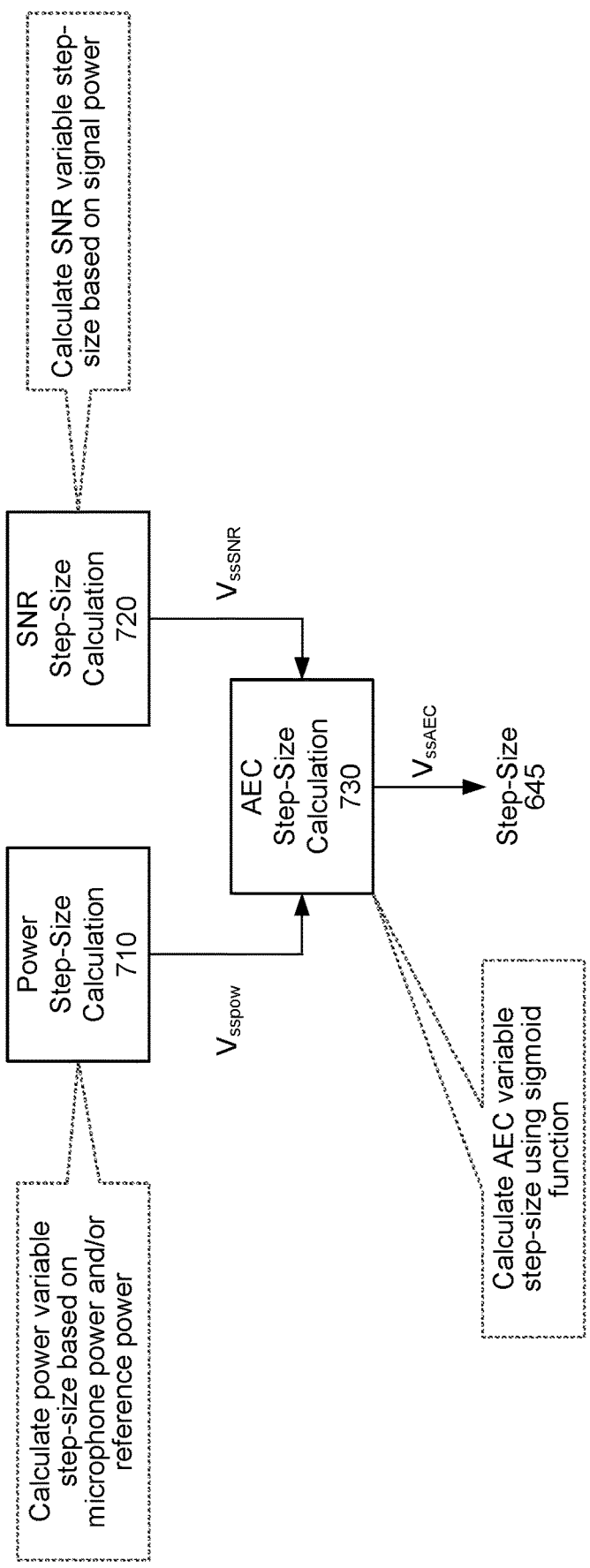
FIG. 7 illustrates a component diagram for performing adaptive step-size calculation according to embodiments of the present disclosure.

FIG. 7 illustrates a component diagram for performing adaptive step-size calculation according to embodiments of the present disclosure. As illustrated in FIG. 7, the device 102 may perform adaptive step-size calculation 700 using a power step-size calculation component 710, an SNR step-size calculation component 720, and a final AEC step-size calculation component 730. For example, the power step-size calculation component 710 may be configured to calculate a power variable step-size value $V_{sspow}$ based on the microphone power and/or the reference power, while the SNR step-size calculation component 720 may be configured to calculate the SNR variable step-size value $V_{ssSNR}$ based on a signal power. Finally, the AEC step-size calculation component 730 may use both the power variable step-size value $V_{sspow}$ and the SNR variable step-size value $V_{ssSNR}$ to calculate the AEC variable step-size value $V_{ssAEC}$ using a sigmoid function, as described in greater detail below with regard to FIGS. 8-9.

In order to calculate the SNR variable step-size based on signal power, in some examples the SNR step-size calculation component 720 may determine SNR values associated with an individual channel index m and frequency band k. The device 102 may determine the SNR value using:

$$SNR = \frac{P_s}{P_n} \quad [19]$$

where the SNR value is calculated for a predefined frequency range (e.g., range of subbands) for a given error signal $E_i$(n, k) at a given frame index n and tone index k (e.g., frequency index). For example, the signal $E_i$(n, k) may correspond to an individual channel from the AEC output audio data 525. Where $S_i$(n, k) is the instantaneous power of the given signal:

$$S_i(n,k) = |E_i(n,k)^2| \quad [20]$$

the device 102 may calculate an average power value across the predefined frequency range (e.g., range of subbands) using:

$$Q_i(n) = \Sigma_{k=startBand}^{stopBand} S_i(n,k) \quad [21]$$

The device 102 may measure the per signal power using a moving average, such as:

$$P_s(n) = \lambda * P_s(n-1) + (1-\lambda) * Q_i(n), \lambda \in [0.75, 0.999] \quad [22]$$

where $P_s$(n) indicates the signal power for the m-th channel index and frame index n, $\lambda$ is a smoothing parameter, $P_s$(n−1) indicates the signal power for the m-th channel index and a previous frame index n−1, and $Q_i$(n) indicates the average power value across the predefined frequency range for the m-th channel index and frame index n.

The device 102 may select a fast smoothing parameter $\lambda_{fast}$ when speech is present in the AEC output audio data 525 and may select a slow smoothing parameter $\lambda_{slow}$ when speech is not present. For example, the fast smoothing parameter $\lambda_{fast}$ may correspond to a first range of values [0.75, 0.85], whereas the slow smoothing parameter $\lambda_{slow}$ may correspond to a second range of values [0.95, 0.999].

$$Q_i(n) > 1.02 * P_s(n) \quad [23]$$

The device 102 may calculate a minimum noise estimate using noise power $P_n$(n) that is calculated similar to the signal power $P_s$(n) using the slow smoothing parameter $\lambda_{slow}$.

$$P_{min} = \min(P_n, \max(N_{adapt} * P_{min}, P_{min} + \text{minNoise})) \quad [24]$$

where $P_{min}$ indicates a minimum noise power, $P_n$ denotes the noise power calculated using the slow smoothing parameter $\lambda_{slow}$, $N_{adapt}$ denotes a noise adaptation value, and minNoise denotes a minimum noise value. The device 102 may measure the noise power $P_n$(n) when a wakeword (WW) is not detected and background noise power measurement may be frozen when speech is detected (e.g., the wakeword and/or an utterance).

The device 102 may calculate a background noise power measurement by estimating the minimum noise power during a first time window (e.g., length of $T_{sec}$). In some examples, the device 102 may store minimum noise power values $P_{min}$ in a buffer having a buffer duration equal to the first time window (e.g., $T_{sec}$) and may determine a current minimum noise power using the buffer. For example, the device 102 may calculate a slow moving average power for each frame and store these slow moving average power values in a circular buffer (e.g., NoiseBuffer), such that:

$$P_{currentmin} = \min(\text{NoiseBuffer}) \quad [25]$$

where $P_{currentmin}$ indicates the current minimum noise power value associated with a current frame.

The value of the current minimum noise power value (e.g., $P_{currentmin}$) may correspond to a minimum noise power measured during the first time window (e.g., $T_{sec}$). In some examples, the device 102 may use the current minimum noise power value as a noise power to calculate the SNR values (e.g., instead of using the noise power $P_n$ described above):

$$SNR = \frac{P_s}{P_{currentmin}} \quad [26]$$

FIG. 8 illustrates examples of determining step-size parameters according to embodiments of the present disclosure. As described above, the system 100 may control an adaptation speed of the first adaptive filter by dynamically determining the step-size values $V_{ssAEC}$ (k, n). For example, the system 100 may determine AEC variable step-size values $V_{ssAEC}$(k,n) 840 using a combination of microphone variable step-size values $V_{ssmics}$(k, n) 810, reference variable step-size values $V_{ssrefs}$(k, n) 820, and SNR variable step-size values $V_{ssSNR}$ (k, n) 830.

As illustrated in FIG. 8, the system 100 may determine the microphone variable step-size values $V_{ssmics}$(k, n) 810 using Equation [1] described above. For example, the system 100 may monitor a microphone signal y(n) 120 corresponding to an individual microphone 118 for a fixed time window and determine a microphone range (e.g., first range of power values), which may comprise a lower boundary (e.g., $P_{Mlow}$) and an upper boundary (e.g., $P_{Mhigh}$). The system 100 may determine a microphone variable step-size value $V_{ssmics}$ (k, n) by comparing a current power value (e.g., $P_{mic}$) of the microphone signal y(n) 120 in the time domain to the microphone range. Thus, the adaptation step-size values indicate a relative strength of the microphone signal y(n) 120 at a particular moment in time relative to the first range of power values detected within the fixed time window (e.g., first duration of time).

For ease of illustration, FIG. 8 illustrates a generalized form of the adaptation step-size values $V_{ssmics}$ associated with an individual microphone 118. However, the disclosure is not limited thereto and the system 100 may refer to individual adaptation step-size values and/or vectors of adaptation step-size values without departing from the disclosure. For example, $V_{ssmics:m}(k, n)$ denotes microphone step-size values associated with the kth tone index (e.g., frequency bin), nth frame index (e.g., group of samples), and mth channel index (e.g., individual microphone 118) included in the microphone signal(s) 120 Y(k, n). Alternatively, $V_{ssmics:m}(n)$ denotes microphone step-size values associated with the nth frame index and the mth channel index.

To improve performance, in some examples the system 100 may restrict the variable microphone step-size parameter $V_{ssmics}$ within a desired range (e.g., $0 \leq V_{ssmics}(k, n) \leq 1$), as shown in Equation [2] and illustrated in FIG. 8. Thus, the system 100 bounds the microphone step-size parameter $V_{ssmics}$ within a range between zero and one (e.g., $0 \leq V_{ssmics} \leq 1$), such that the microphone step-size parameter $V_{ssmics}$ is equal to zero (e.g., $V_{ssmics}=0$) when the current microphone power is less than or equal to the microphone lower boundary (e.g., $P_{mic} \leq P_{Mlow}$) and equal to one (e.g., $V_{ssmics}=1$) when the current microphone power is greater than or equal to the microphone upper boundary (e.g., $P_{mic} \geq P_{Mhigh}$).

Similarly, the system 100 may determine the reference variable step-size values $V_{ssrefs}(k, n)$ 820 using Equation [3] described above. For example, the system 100 may monitor a playback signal x(n) 112 corresponding to an individual loudspeaker 114 for the fixed time window and determine a reference range (e.g., second range of power values), which may comprise a lower boundary (e.g., $P_{Rlow}$) and an upper boundary (e.g., $P_{Rhigh}$). The system 100 may determine a reference variable step-size value $V_{ssrefs}(k, n)$ by comparing a current power value (e.g., $P_{ref}$) of the playback signal x(n) 112 in the time domain to the reference range. Thus, the adaptation step-size values indicate a relative strength of the playback signal x(n) 112 at a particular moment in time relative to the second range of power values detected within the fixed time window (e.g., first duration of time).

For ease of illustration, FIG. 8 illustrates a generalized form of the adaptation step-size values $V_{ssrefs}$ associated with an individual loudspeaker 114. However, the disclosure is not limited thereto and the system 100 may refer to individual adaptation step-size values and/or vectors of adaptation step-size values without departing from the disclosure. For example, $V_{ssrefs:p}(k,n)$ denotes reference step-size values associated with the kth tone index (e.g., frequency bin), nth frame index (e.g., group of samples), and pth channel index (e.g., individual loudspeaker 114) included in the playback signal(s) 112 X(k, n). Alternatively, $V_{ssrefs:p}(n)$ denotes microphone step-size values associated with the nth frame index and the pth channel index.

To improve performance, in some examples the system 100 may restrict the variable reference step-size parameter $V_{ssrefs}$ within a desired range (e.g., $0 \leq V_{ssrefs}(k,n) \leq 1$), as shown in Equation [4] and illustrated in FIG. 8. Thus, the system 100 bounds the reference step-size parameter $V_{ssrefs}$ within a range between zero and one (e.g., $0 \leq V_{ssrefs} \leq 1$), such that the reference step-size parameter $V_{ssrefs}$ is equal to zero (e.g., $V_{ssrefs}=0$) when the current reference power is less than or equal to the reference lower boundary (e.g., $P_{ref} \leq P_{Rlow}$) and equal to one (e.g., $V_{ssrefs}=1$) when the current reference power is greater than or equal to the reference upper boundary (e.g., $P_{ref} \geq P_{Rhigh}$).

In addition, the system 100 may determine the SNR variable step-size values $V_{ssSNR}(k, n)$ 830 as shown below:

$$V_{ssSNR} = \frac{A}{1 + B * SNR} \quad [27]$$

$$V_{ssSNR} = \min(1, V_{ssSNR})$$

where SNR denotes a signal-to-noise ratio (SNR) value, A and B are adjustable parameters, and $V_{ssSNR}$ denotes adaptation step-size values (e.g., one or more vectors of adaptation step-size values) determined based on the SNR value. In some examples, the first adjustable parameter A can be set to a first value (e.g., A=1.021) and the second adjustable parameter B can be set to a second value (e.g., B=0.21), although the disclosure is not limited thereto.

For ease of illustration, FIG. 8 illustrates a generalized form of the SNR adaptation step-size values $V_{ssSNR}$. However, the disclosure is not limited thereto and the system 100 may refer to individual adaptation step-size values and/or vectors of adaptation step-size values without departing from the disclosure. For example, $V_{ssSNR:p}(k,n)$ denotes SNR step-size values associated with the kth tone index (e.g., frequency bin), nth frame index (e.g., group of samples), and pth beam index. Alternatively, $V_{ssSNR:p}(n)$ denotes SNR step-size values associated with the nth frame index and the pth beam index. To improve performance, in some examples the system 100 may restrict the variable SNR step-size parameter $V_{ssSNR}$ within a desired range (e.g., $0 \leq V_{ssSNR}(k, n) \leq 1$), as illustrated in FIG. 8. Thus, the system 100 bounds the SNR step-size parameter $V_{ssSNR}$ within a range between zero and one (e.g., $0 \leq V_{ssSNR} \leq 1$).

Finally, the system 100 may determine the AEC variable step-size values $V_{ssAEC}(k, n)$ 840 using a combination of the microphone variable step-size values $V_{ssmics}(k, n)$ 810, the reference variable step-size values $V_{ssrefs}(k, n)$ 820, and the SNR variable step-size values $V_{ssSNR}(k, n)$ 830. As illustrated in FIG. 8, in some examples the system 100 may determine the AEC variable step-size values $V_{ssAEC}(k, n)$ 840 by multiplying the microphone variable step-size values $V_{ssmics}(k, n)$ 810, the reference variable step-size values $V_{ssrefs}(k, n)$ 820, and the SNR variable step-size values $V_{ssSNR}(k, n)$ 830. For example, the system 100 may multiply a microphone step-size value $V_{ssmics}(k,n)$, a reference step-size value $V_{ssrefs}(k,n)$, and a SNR variable step-size values $V_{ssSNR}(k, n)$ to calculate a scalar value and then map the scalar value to a step-size value $V_{ssAEC}(k, n)$ using a sigmoid curve or the like, as shown below:

$$V_{ssAEC} = \text{sigmoid}(V_{ssmics} * V_{ssrefs} * V_{ssSNR}) \quad [28.1]$$

where $V_{ssmics}$ denotes first adaptation step-size values associated with the microphone signals, $V_{ssrefs}$ denotes second adaptation step-size values associated with the reference signals, $V_{ssSNR}$ denotes third adaptation step-size values corresponding to the SNR values, and $V_{ssAEC}$ denotes fourth adaptation step-size values (e.g., step-size values 645) received by the first adaptive filter.

However, the disclosure is not limited thereto, and in other examples the system 100 may map the microphone step-size value $V_{ssmics}(k, n)$ to a first scalar value (e.g., using a first sigmoid curve), map the reference step-size value $V_{ssrefs}(k, n)$ to a second scalar value (e.g., using a second sigmoid curve), map the SNR variable step-size values $V_{ssSNR}(k, n)$ to a third scalar value (e.g., using a third sigmoid curve), and then calculate the step-size value $V_{ssAEC}(k, n)$ using the first scalar value, the second scalar value, and the third scalar value, although the disclosure is not limited thereto. Additionally or alternatively, the system 100 may determine the AEC variable step-size values $V_{ssAEC}(k, n)$ 840 by processing the microphone variable step-size values $V_{ssmics}(k, n)$ 810, the reference variable step-size values $V_{ssrefs}(k, n)$ 820, and the SNR variable step-size values $V_{ssSNR}(k, n)$ 830 using any technique known to one of skill in the art without departing from the disclosure.

In some examples, Equation [28.1] can be rewritten as:

$$V_{ssAEC:m\cdot p}(k,n) = \text{sigmoid}(V_{ssmics:m}(k,n) V_{ssrefs:p}(k,n) V_{ssSNR:m}(k,n)) \quad [28.2]$$

where k denotes a tone index, n denotes a frame index, $V_{ssmics:m}(k, n)$ denotes microphone step-size values associated with the mth channel index (e.g., individual microphone 118) included in the microphone signal(s) Y(k, n) 120, $V_{ssrefs:p}(k, n)$ denotes reference step-size values associated with the pth reference index, $V_{ssSNR:m}(k, n)$ denotes SNR step-size values associated with the mth channel index (e.g., AEC output audio data generated by the AEC component 104), and $V_{ssAEC:m\cdot p}(k,n)$ denotes step-size values 645 associated with the mth channel index and the pth reference index. While Equation [15.2] specifies a portion of the third adaptation step-size values that correspond to the mth channel index and pth beam index (e.g., $V_{ssAEC:m\cdot p}(k, n)$), this is intended to conceptually illustrate how these values are calculated and the disclosure is not limited thereto. Instead, the step-size values 645 may be generally referred to as $V_{ssAEC}(k,n)$, without specifying a particular combination of channel indexes without departing from the disclosure.

In some examples, the sigmoid function can be defined as:

$$\text{sigmoid}(t) = \frac{a}{(1 + \exp(-b*(t-c)))} \quad [29]$$

where a, b, and c represent adjustable parameters. In some examples, the device 102 may set the first adjustable parameter a to a first value (e.g., 1.0), the second adjustable parameter b to a second value (e.g., 15), and the third adjustable parameter c to a third value (e.g., 0.5), although the disclosure is not limited thereto.

FIG. 9 illustrates examples of a sigmoid function and a variable step-size controlled based on a signal quality metric according to embodiments of the present disclosure. As illustrated in FIG. 9, the system 100 may use a sigmoid function 910 to determine the variable step-size value $V_{ss}$. For example, the system 100 may select parameters for A and B in order to tune the variable step-size value $V_{ss}$ relative to the signal-to-noise ratio (SNR). In this example, the system 100 may select parameters for A and B such that a first variable step-size value (e.g., $V_{ss}$=0.5) corresponds to a first SNR value (e.g., SNR=7 dB) and a second variable step-size value (e.g., $V_{ss}$=0) corresponds to SNR values exceeding a second SNR value (e.g., SNR≥15 dB). Additionally or alternatively, the system 100 may freeze adaptation for variable step-size values below the first variable step-size value (e.g., $V_{ss}$<0.5), which is equivalent of freezing adaptation for SNR values exceeding a third SNR value (e.g., SNR≥7 dB).

An example of controlling the variable step-size value $V_{ss}$ based on a signal quality metric is illustrated in FIG. 9 as Vss-SNR chart 920. As shown in the Vss-SNR chart 920, the variable step-size value $V_{ss}$ goes to zero when there is an utterance or a wakeword represented in the audio data.

The step-size controller component 640 may send the step-size values $V_{ssAEC}(k, n)$ 645 to the transfer function 620 (e.g., first adaptive filter) and the transfer function 620 may use the step-size values $V_{ssAEC}(k, n)$ 645 to control how quickly the first adaptive filter updates the plurality of filter coefficient values.

As described above, the step-size controller component 640 may control the step-size value $V_{ssAEC}(k,n)$ 645 so that the first adaptive filter adapts slowly when near-end signals are present and adapts quickly when the near-end signal is not present. Thus, the first adaptive filter updates the adaptive filter coefficient values (e.g., weights) when the near-end signal is not present, enabling the system 100 to better model the near-end disturbance statistics while the near-end signal is present. In addition to selecting a lower step-size value, the system 100 may also slow a rate at which the adaptive filters update the plurality of filter coefficient values, although the disclosure is not limited thereto.

To stop the adaptive filter from diverging in the presence of a large near-end signal, in some examples the system 100 may constrain the filter update at each iteration:

$$\|\hat{W}_p(k,n) - \hat{W}_p(k,n-1)\|^2 \leq \delta \quad [30]$$

where $\hat{W}_p(k, n)$ denotes the weight vector (e.g., adaptive filter coefficients weight vector) for the pth channel index, kth tone index, and nth frame index, $\hat{W}_p(k, n-1)$ denotes the weight vector for a previous frame index (e.g., n−1), and $\delta$ denotes a threshold parameter. The system 100 may select a fixed value of the threshold parameter $\delta$ for all tone indexes and/or frame indexes, although the disclosure is not limited thereto and in some examples the system 100 may determine the threshold parameter individually for each tone index and/or frame index (e.g., $\delta_{k,n}$) without departing from the disclosure.

Additionally or alternatively, the system 100 may control an adaptation speed of the first adaptive filter by performing error normalization to limit the rate of adaptation. As illustrated in FIG. 6, an error normalization component 650 may receive the error signal E(k, n) 635 and determine a normalized error signal $E_n(k, n)$ 655. For example, the error normalization component may generate the normalized error signal 655 using Equation [7], described in greater detail above. Thus, if the error signal 635 exceeds a threshold value (e.g., standard deviation of the error signal 635), the system 100 may perform error normalization 160 and determine the normalized error signal 655 while limiting the rate of adaptation. A standard deviation (e.g., std( )) is a measure of how dispersed the data is in relation to the mean. For example, a low standard deviation indicates that data is clustered around the mean, whereas a high standard deviation indicates that data is more spread out.

In some examples, the system 100 may use the normalized error signal 655 when adapting the first adaptive filter and determining updated filter coefficient values. For example, while Equation [8] illustrates that the system 100 may determine a first adaptive filter coefficients weight vector using the error signal E(k, n), the disclosure is not limited thereto and the system 100 may determine the first adaptive filter coefficients weight vector using the normalized error signal $E_n(k, n)$ 655 without departing from the disclosure. Thus, the system 100 may substitute the normalized error signal $E_n(k, n)$ 655 in order to control a rate at which the adaptive filter coefficients update when the error exceeds the threshold value.

Referring back to FIG. 6, the error normalization component 650 may output the normalized error signal $E_n(k, n)$ 655 to a filter coefficient update component 660, which may also receive the step-size values $V_{ssAEC}(k, n)$ 645 from the step-size controller component 640. Using the step-size values $V_{ssAEC}(k, n)$ 645 and the normalized error signal $E_n(k, n)$ 655, the filter coefficient update component 660 may generate updated filter coefficients $W_p(k, n)$ 665 associated with the first adaptive filter (e.g., transfer function 620). For example, the device 102 may perform a coefficient update 850 to generate the updated filter coefficients $W_p(k,n)$ 665, as described above with regard to Equation [8].

In some examples, the system 100 may use the normalized error signal 655 when adapting the first adaptive filter and determining updated filter coefficient values. For example, while Equation [8] illustrates that the system 100 may determine a first adaptive filter coefficients weight vector using the error signal $E(k, n)$ 635, the disclosure is not limited thereto and the system 100 may determine the first adaptive filter coefficients weight vector using the normalized error signal $E_n(k, n)$ 655 without departing from the disclosure. Thus, the system 100 may substitute the normalized error signal $E_n(k, n)$ 655 in order to control a rate at which the adaptive filter coefficients update when the error exceeds the threshold value.

Figure 10:
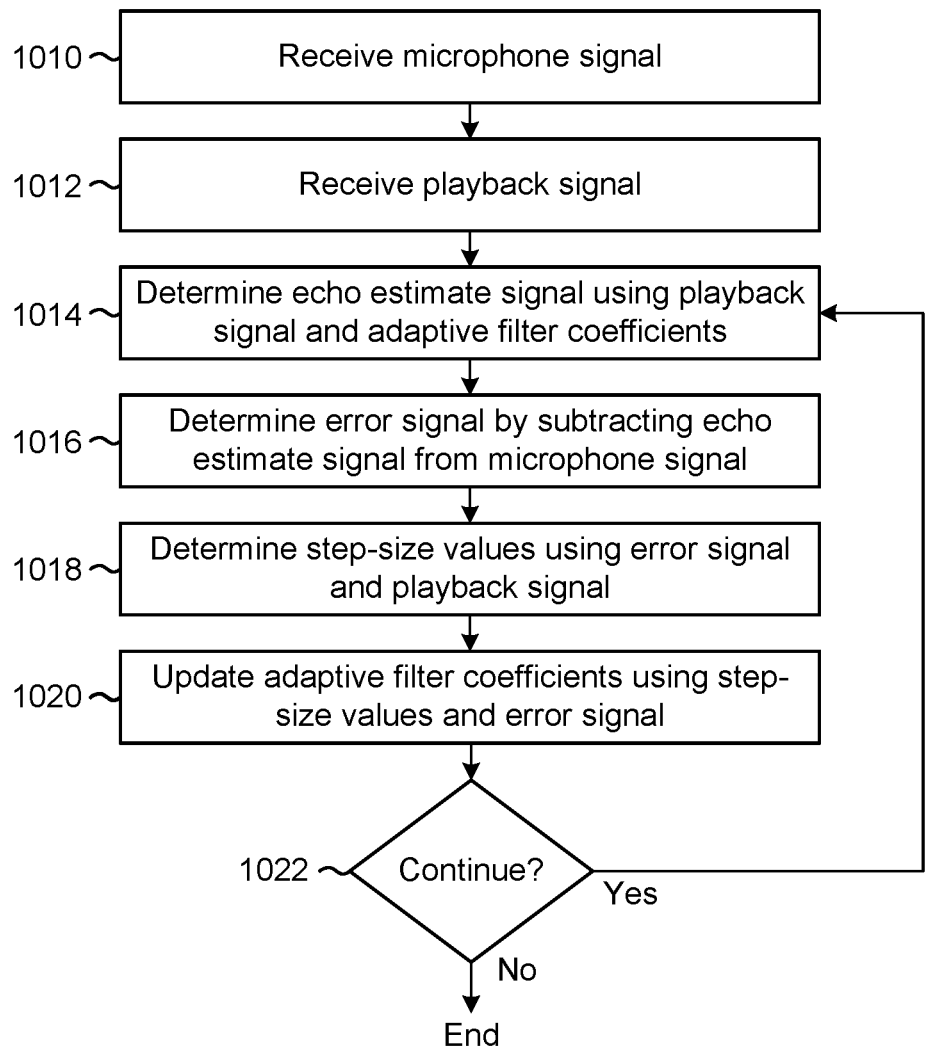
FIG. 10 is a flowchart conceptually illustrating an example method for performing echo cancellation according to embodiments of the present disclosure.

FIG. 10 is a flowchart conceptually illustrating an example method for performing echo cancellation according to embodiments of the present disclosure. As illustrated in FIG. 10, the system 100 may receive (1010) a microphone signal (e.g., microphone signal $Y(k, n)$ 610), may receive (1012) a playback signal (e.g., playback signal $X(k, n)$ 615), and may determine (1014) an echo estimate signal (e.g., echo estimate signal $\hat{Y}(k,n)$ 625) using the playback signal and adaptive filter coefficient values (e.g., adaptive filter coefficients $W_p(k, n)$ 665) of an adaptive filter (e.g., transfer function $\hat{H}_p(k)$ 620). After using the adaptive filter coefficients $W(k, n)$ 665 to determine the echo estimate signal $\hat{Y}(k, n)$ 625, the system 100 may determine (1016) an error signal (e.g., error signal $E(k, n)$ 635) by subtracting the echo estimate signal from the microphone signal, as described in greater detail above with regard to FIGS. 5-6.

As illustrated in FIG. 6, the system 100 may perform acoustic echo cancellation 600 using a microphone signal $Y(k, n)$ 610 (e.g., microphone audio signal) and a playback signal $X(k, n)$ 615 (e.g., reference audio signal). As described above, an estimated transfer function $\hat{H}_p(k)$ 620 may model or represent an acoustic echo (e.g., impulse response) between an individual loudspeaker 114 and an individual microphone 118. For example, the transfer function $\hat{H}_p(k)$ 620 may correspond to a first plurality of adaptive filter coefficient values (e.g., adaptive filter coefficients weight vector $W_p(k, n)$) associated with a first adaptive filter and the system 100 may use the first plurality of adaptive filter coefficient values $W_p(k,n)$ to process the playback signal $X(k, n)$ 615 and generate the echo estimate signal $\hat{Y}(k, n)$ 625. To perform echo cancellation, the system 100 may subtract the echo estimate signal $\hat{Y}(k, n)$ 625 from the microphone signal $Y(k, n)$ 610 to generate the error signal $E(k, n)$ 635.

Referring back to FIG. 10, the system 100 may determine (1018) a plurality of step-size values (e.g., determine step-size values $V_{ssAEC}(k, n)$ 645) using the error signal and the playback signal, as described above with regard to FIGS. 1A and 6, and may update (1020) the adaptive filter coefficient values (e.g., adaptive filter coefficients $W_p(k, n)$ 665) using the step-size values and the error signal (e.g., error signal $E(k, n)$ 635). For example, the system 100 may perform adaptation using the first plurality of adaptive filter coefficient values to generate a second plurality of adaptive filter coefficient values. As described above with regard to Equation [8], the system 100 may determine the second plurality of adaptive filter coefficient values using the first plurality of adaptive filter coefficient values, the step-size values, the error signal or optionally a normalized error signal (e.g., normalized error 655), and the playback signal $X(k, n)$ 615.

After updating the adaptive filter coefficient values, the system 100 may determine (1022) whether to continue performing echo cancellation and, if so, may loop to step 1014 and repeat steps 1014-1020 using the updated adaptive filter coefficient values (e.g., second plurality of adaptive filter coefficient values). For example, the system 100 may use the second plurality of adaptive filter coefficient values and a second portion of the playback signal $X(k, n)$ 615 to determine a second portion of the echo estimate signal $\hat{Y}(k, n)$ 625. This may continue until the system 100 determines to end echo cancellation, which may occur when the microphone signal $Y(k, n)$ 610 and/or the playback signal $X(k, n)$ 615 are below a threshold value.

For ease of illustration, FIG. 10 illustrates an example of performing echo cancellation involving a single microphone signal and a single playback signal. However, the disclosure is not limited thereto and the steps illustrated in FIG. 10 may be repeated for two or more playback signals and/or two or more microphone signals without departing from the disclosure, as described in greater detail above with regard to FIG. 1B.

Figure 11:
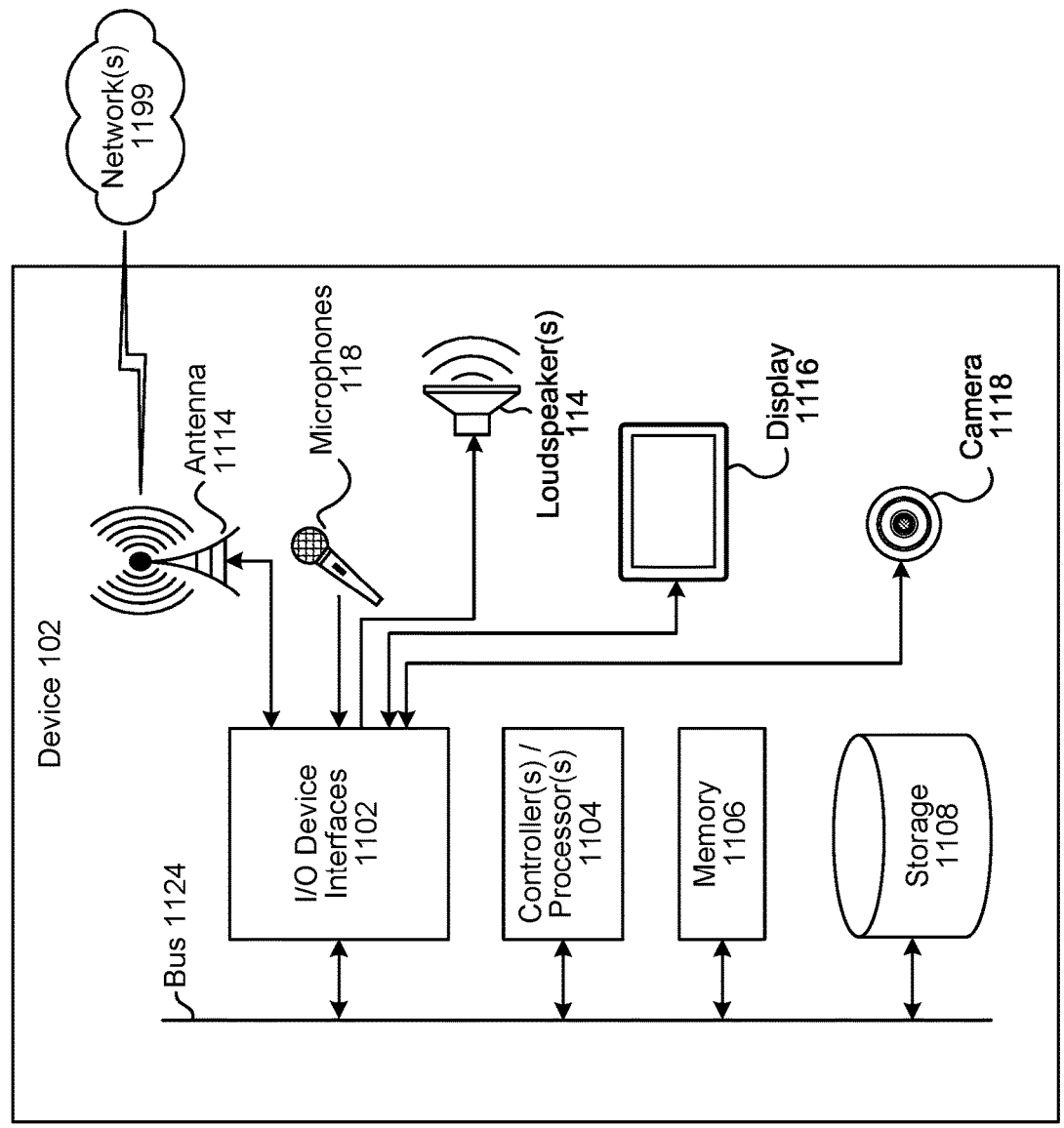
FIG. 11 is a block diagram conceptually illustrating example components of a system for echo cancellation according to embodiments of the present disclosure.

FIG. 11 is a block diagram conceptually illustrating a device 102 that may be used with the system 100. The device 102 may include one or more controllers/processors 1104, which may each include a central processing unit (CPU) for processing data and computer-readable instructions, and a memory 1106 for storing data and instructions of the respective device. The memory 1106 may include volatile random access memory (RAM), non-volatile read only memory (ROM), non-volatile magnetoresistive memory (MRAM), and/or other types of memory. The device 102 may also include a data storage component 1108 for storing data and controller/processor-executable instructions. Each data storage component 1108 may individually include one or more non-volatile storage types such as magnetic storage, optical storage, solid-state storage, etc. The device 102 may also be connected to removable or external non-volatile memory and/or storage (such as a removable memory card, memory key drive, networked storage, etc.) through respective input/output device interfaces 1102.

Computer instructions for operating the device 102 and its various components may be executed by the respective device's controller(s)/processor(s) 1104, using the memory 1106 as temporary "working" storage at runtime. A device's computer instructions may be stored in a non-transitory manner in non-volatile memory 1106, storage 1108, or an external device(s). Alternatively, some or all of the executable instructions may be embedded in hardware or firmware on the respective device in addition to or instead of software.

The device 102 includes input/output device interfaces 1102. A variety of components may be connected through the input/output device interfaces 1102, as will be discussed further below. Additionally, the device 102 may include an address/data bus 1124 for conveying data among components of the respective device. Each component within a device 102 may also be directly connected to other components in addition to (or instead of) being connected to other components across the bus 1124.

Referring to FIG. 11, the device 102 may include input/output device interfaces 1102 that connect to a variety of components such as an audio output component such as a loudspeaker 14, a wired headset or a wireless headset (not illustrated), or other component capable of outputting audio. The device 102 may also include an audio capture component. The audio capture component may be, for example, microphone(s) 118 or array of microphones, a wired headset, or a wireless headset, etc. If an array of microphones is included, approximate distance to a sound's point of origin may be determined by acoustic localization based on time and amplitude differences between sounds captured by different microphones of the array. The device 102 may optionally include a display 1116 for displaying content, although the disclosure is not limited thereto. While FIG. 11 illustrates the device 102 connecting to the loudspeaker 114, the antenna 1114, the display 1116, and the microphone(s) 118, the disclosure is not limited thereto and the device 102 may connect to any combination of these components without departing from the disclosure.

Via antenna(s) 1114, the input/output device interfaces 1102 may connect to one or more networks 1199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1199, the system may be distributed across a networked environment. The I/O device interface 1102 may also include communication components that allow data to be exchanged between devices such as different physical systems in a collection of systems or other components.

The components of the device 102 may include their own dedicated processors, memory, and/or storage. Alternatively, one or more of the components of the device 102 may utilize the I/O interfaces 1102, processor(s) 1104, memory 1106, and/or storage 1108 of the device 102.

As noted above, multiple devices may be employed in a single system. In such a multi-device system, each of the devices may include different components for performing different aspects of the system's processing. The multiple devices may include overlapping components. The components of the device 102, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by a device, a first reference audio signal;
   generating, by a first loudspeaker of the device using the first reference audio signal, an audible sound;
   receiving, from a microphone of the device, a first microphone signal including a first representation of the audible sound;
   determining, using the first reference audio signal and a first plurality of filter coefficient values of a first adaptive filter, a first echo estimate signal that represents a portion of the first microphone signal;
   determining a combined echo estimate signal by summing a plurality of echo estimate signals, the plurality of echo estimate signals including the first echo estimate signal and a second echo estimate signal corresponding to a second reference audio signal;
   determining a first error signal by subtracting the combined echo estimate signal from the first microphone signal;
   determining that the first error signal exceeds a threshold value indicating that near-end activity is represented in the first microphone signal;

determining a second error signal by performing a normalization operation using the first error signal;
determining a first range of values associated with the first microphone signal and a first time window;
determining, using the first range of values and a first value of the first microphone signal, a first step-size value, wherein the first step-size value represents a rate at which the first adaptive filter updates; and
determining a second plurality of filter coefficient values for the first adaptive filter using the second error signal, the first step-size value, the first reference audio signal, and the first plurality of filter coefficient values.

2. The computer-implemented method of claim 1, further comprising:
determining at least one standard deviation value associated with the first error signal, wherein the threshold value corresponds to the at least one standard deviation value,
wherein determining the second error signal further comprises:
determining the second error signal using the first error signal, an absolute value of the first error signal, and the at least one standard deviation value.

3. The computer-implemented method of claim 1, further comprising:
determining a second range of values associated with the first reference audio signal and the first time window,
wherein determining the first step-size value further comprises:
determining, using the first range of values and the first value, a second step-size value;
determining, using the second range of values and a second value of the first reference audio signal, a third step-size value; and
determining the first step-size value using the second step-size value, the third step-size value, and a sigmoid function.

4. The computer-implemented method of claim 1, wherein determining the first step-size value further comprises:
determining a second value representing a lowest value of the first range of values;
determining a third value representing a highest value of the first range of values;
determining a first difference value by subtracting the second value from the first value;
determining a second difference value by subtracting the second value from the third value; and
determining the first step-size value by dividing the first difference value by the second difference value.

5. A computer-implemented method, the method comprising:
receiving a first reference signal corresponding to a first audio channel;
receiving a second reference signal corresponding to a second audio channel;
receiving a first audio input signal;
determining, using the first reference signal and a first adaptive filter, a first echo signal that represents a first portion of the first audio input signal;
determining, using the second reference signal and a second adaptive filter, a second echo signal that represents a second portion of the first audio input signal;
generating a first combined echo signal using the first echo signal and the second echo signal;
determining a first error signal using the first combined echo signal and the first audio input signal;
determining a first range of values associated with the first audio input signal and a first time window;
determining, using the first range of values and the first audio input signal, a first step-size value, wherein the first step-size value represents a rate at which the first adaptive filter updates filter coefficients over time; and
determining a first plurality of filter coefficient values associated with the first adaptive filter based on the first error signal, the first step-size value, and the first reference signal.

6. The computer-implemented method of claim 5, further comprising:
determining a first power value associated with the first error signal;
determining that the first power value exceeds a threshold value; and
determining a second error signal by performing a normalization operation using the first error signal, wherein the first plurality of filter coefficient values are determined using the second error signal.

7. The computer-implemented method of claim 5, further comprising:
determining a first value corresponding to a variance of the first error signal;
determining a second value corresponding to a power level of the first error signal;
determining that the second value exceeds the first value;
determining a normalized error signal using the first error signal; and
determining a second error signal based on the normalized error signal and the variance of the first error signal, wherein the first plurality of filter coefficient values are determined using the second error signal.

8. The computer-implemented method of claim 5, further comprising:
determining a second range of values associated with the first reference signal and the first time window,
wherein determining the first step-size value further comprises:
determining, using the first range of values and the first audio input signal, a second step-size value;
determining, using the second range of values and the first reference signal, a third step-size value; and
determining the first step-size value using the second step-size value and the third step-size value.

9. The computer-implemented method of claim 5, further comprising:
determining a second range of values associated with the first reference signal and the first time window;
determining, using the second range of values and the first reference signal, a second step-size value; and
determining a third step-size value using the first step-size value, the second step-size value, and a sigmoid function, wherein the first plurality of filter coefficient values are determined using the third step-size value.

10. The computer-implemented method of claim 5, further comprising:
determining a first value using the first step-size value and a sigmoid function;
determining a second step-size value associated with the first reference signal;
determining a second value using the second step-size value and the sigmoid function; and
determining a third step-size value using the first value and the second value, wherein the first plurality of filter coefficient values are determined using the third step-size value.

11. The computer-implemented method of claim 5, further comprising:
- determining, using the first reference signal and the first plurality of filter coefficient values, a third echo signal that represents a third portion of the first audio input signal;
- determining, using the second reference signal, the second adaptive filter, and the first step-size value, a fourth echo signal that represents a fourth portion of the first audio input signal;
- generating a second combined echo signal using the third echo signal and the fourth echo signal;
- determining a second error signal using the second combined echo signal and the first audio input signal; and
- determining a second plurality of coefficient values associated with the first adaptive filter based on the second error signal and the first reference signal.

12. The computer-implemented method of claim 5, further comprising:
- determining that a series of power values associated with a third portion of the first audio input signal are below a threshold value;
- determining, using the first reference signal and the first plurality of filter coefficient values, a third echo signal that represents the third portion of the first audio input signal; and
- associating the first adaptive filter with a second step-size value while processing the third portion of the first audio input signal, the second step-size value equal to zero.

13. A system comprising:
at least one processor; and
memory including instructions operable to be executed by the at least one processor to cause the system to:
- receive a first reference signal corresponding to a first audio channel;
- receive a second reference signal corresponding to a second audio channel;
- receive a first audio input signal;
- determine, using the first reference signal and a first adaptive filter, a first echo signal that represents a first portion of the first audio input signal;
- determine, using the second reference signal and a second adaptive filter, a second echo signal that represents a second portion of the first audio input signal;
- generate a first combined echo signal using the first echo signal and the second echo signal;
- determine a first error signal using the first combined echo signal and the first audio input signal;
- determine a first range of values associated with the first audio input signal and a first time window;
- determine, using the first range of values and a first value of the first audio input signal, a first step-size value, wherein the first step-size value represents a rate at which the first adaptive filter updates filter coefficients over time; and
- determine a first plurality of filter coefficient values associated with the first adaptive filter based on the first error signal, the first step-size value, and the first reference signal.

14. The system of claim 13, wherein the memory further comprises instructions that, when executed by the at least one processor, further cause the system to:
- determine a first power value associated with the first error signal;
- determine that the first power value exceeds a threshold value; and
- determine a second error signal by performing a normalization operation using the first error signal, wherein the first plurality of filter coefficient values are determined using the second error signal.

15. The system of claim 13, wherein the memory further comprises instructions that, when executed by the at least one processor, further cause the system to:
- determine a first value corresponding to a variance of the first error signal;
- determine a second value corresponding to a power level of the first error signal;
- determine that the second value exceeds the first value;
- determine a normalized error signal using the first error signal; and
- determine a second error signal based on the normalized error signal and the variance of the first error signal, wherein the first plurality of filter coefficient values are determined using the second error signal.

16. The system of claim 13, wherein the memory further comprises instructions that, when executed by the at least one processor, further cause the system to:
- determine a second range of values associated with the first reference signal and the first time window;
- determine, using the first range of values and the first audio input signal, a second step-size value;
- determine, using the second range of values and the first reference signal, a third step-size value; and
- determine the first step-size value using the second step-size value and the third step-size value.

17. The system of claim 13, wherein the memory further comprises instructions that, when executed by the at least one processor, further cause the system to:
- determine a second range of values associated with the first reference signal and the first time window;
- determine, using the second range of values and the first reference signal, a second step-size value; and
- determine a third step-size value using the first step-size value, the second step-size value, and a sigmoid function, wherein the first plurality of filter coefficient values are determined using the third step-size value.

18. The system of claim 13, wherein the memory further comprises instructions that, when executed by the at least one processor, further cause the system to:
- determine a first value using the first step-size value and a sigmoid function;
- determine a second step-size value associated with the first reference signal;
- determine a second value using the second step-size value and the sigmoid function; and
- determine a third step-size value using the first value and the second value, wherein the first plurality of filter coefficient values are determined using the third step-size value.

19. The system of claim 13, wherein the memory further comprises instructions that, when executed by the at least one processor, further cause the system to:
- determine, using the first reference signal and the first plurality of filter coefficient values, a third echo signal that represents a third portion of the first audio input signal;
- determine, using the second reference signal, the second adaptive filter, and the first step-size value, a fourth echo signal that represents a fourth portion of the first audio input signal;

generate a second combined echo signal using the third echo signal and the fourth echo signal;

determine a second error signal using the second combined echo signal and the first audio input signal; and determine a second plurality of coefficient values associated with the first adaptive filter based on the second error signal and the first reference signal.

20. The system of claim 13, wherein the memory further comprises instructions that, when executed by the at least one processor, further cause the system to:

determine that a series of power values associated with a third portion of the first audio input signal are below a threshold value;

determine, using the first reference signal and the first plurality of filter coefficient values, a third echo signal that represents the third portion of the first audio input signal; and associate the first adaptive filter with a second step-size value while processing the third portion of the first audio input signal, the second step-size value equal to zero.

* * * * *